(12) United States Patent
Ito

(10) Patent No.: US 10,341,567 B2
(45) Date of Patent: Jul. 2, 2019

(54) PHOTOGRAPHING APPARATUS

(71) Applicant: RICOH IMAGING COMPANY, LTD., Tokyo (JP)

(72) Inventor: Eiichi Ito, Chiba (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 29 days.

(21) Appl. No.: 15/434,483

(22) Filed: Feb. 16, 2017

(65) Prior Publication Data

US 2017/0272658 A1    Sep. 21, 2017

(30) Foreign Application Priority Data

Mar. 16, 2016  (JP) .................................. 2016-052361
Feb. 14, 2017  (JP) .................................. 2017-024754

(51) Int. Cl.
*G02B 7/28*    (2006.01)
*G02B 7/34*    (2006.01)
*G02B 7/36*    (2006.01)
*G02B 7/38*    (2006.01)
*G03B 13/02*   (2006.01)
*G03B 13/36*   (2006.01)
*H04N 5/225*   (2006.01)
(Continued)

(52) U.S. Cl.
CPC ......... *H04N 5/23287* (2013.01); *G02B 7/287* (2013.01); *G02B 7/34* (2013.01); *G02B 7/36* (2013.01); *G02B 7/38* (2013.01); *G03B 13/02* (2013.01); *G03B 13/36* (2013.01); *H04N 5/2253* (2013.01); *H04N 5/2254* (2013.01); *H04N 5/23212* (2013.01); *H04N 5/23258* (2013.01); *H04N 5/2621* (2013.01)

(58) Field of Classification Search
None
See application file for complete search history.

(56) References Cited

U.S. PATENT DOCUMENTS 5,157,563 A    10/1992  Yokoyama et al.
6,456,788 B1 *  9/2002  Otani ..................... G03B 13/02
                                                     396/123
(Continued)

FOREIGN PATENT DOCUMENTS

JP    S59-011071 A    1/1984
JP    H02-154313 A   6/1990
(Continued)

OTHER PUBLICATIONS

U.S. Appl. No. 15/361,190 to Eiichi Ito et al., which was filed on Nov. 25, 2016.
(Continued)

*Primary Examiner* — Roberto Velez
*Assistant Examiner* — Quan Pham
(74) *Attorney, Agent, or Firm* — Greenblum & Bernstein, P.L.C.

(57) ABSTRACT

A photographing apparatus includes an imaging-plane tilter configured to tilt an imaging plane, formed by a photographing optical system, relative to a plane that is orthogonal to an optical axis of the photographing optical system; a focus detector provided with a plurality of focus detection areas; and a tilt controller configured to control the imaging-plane tilter to tilt the imaging plane based on focus deviation amounts of the plurality of focus detection areas.

16 Claims, 15 Drawing Sheets

(51) Int. Cl.
*H04N 5/232* (2006.01)
*H04N 5/262* (2006.01)

(56) References Cited

U.S. PATENT DOCUMENTS

| | | | |
|---|---|---|---|
| 6,567,126 B1* | 5/2003 | Slatter | G02B 7/28 |
| | | | 348/345 |
| 2005/0157180 A1* | 7/2005 | Takahashi | H04N 5/217 |
| | | | 348/207.99 |
| 2008/0159727 A1* | 7/2008 | Hamamura | G02B 7/102 |
| | | | 396/104 |
| 2009/0096913 A1* | 4/2009 | Wang | G02B 7/36 |
| | | | 348/345 |
| 2012/0268642 A1 | 10/2012 | Kawai | |
| 2013/0194442 A1 | 8/2013 | Yazawa | |
| 2014/0160267 A1* | 6/2014 | Kawakami | G02B 21/244 |
| | | | 348/79 |
| 2015/0365584 A1* | 12/2015 | Samurov | G03B 13/36 |
| | | | 348/349 |

FOREIGN PATENT DOCUMENTS

| JP | H08-265612 A | 10/1996 |
|---|---|---|
| JP | 2008-035308 A | 2/2008 |
| JP | 2012-226205 A | 11/2012 |
| JP | 2013-160806 A | 8/2013 |

OTHER PUBLICATIONS

U.S. Appl. No. 15/362,059 to Eiichi Ito, which was filed on Nov. 28, 2016.
U.S. Appl. No. 15/435,352 to Eiichi Ito, which was filed on Feb. 17, 2017.
U.S. Appl. No. 15/434,461 to Eiichi Ito, which was filed on Feb. 16, 2017.

* cited by examiner

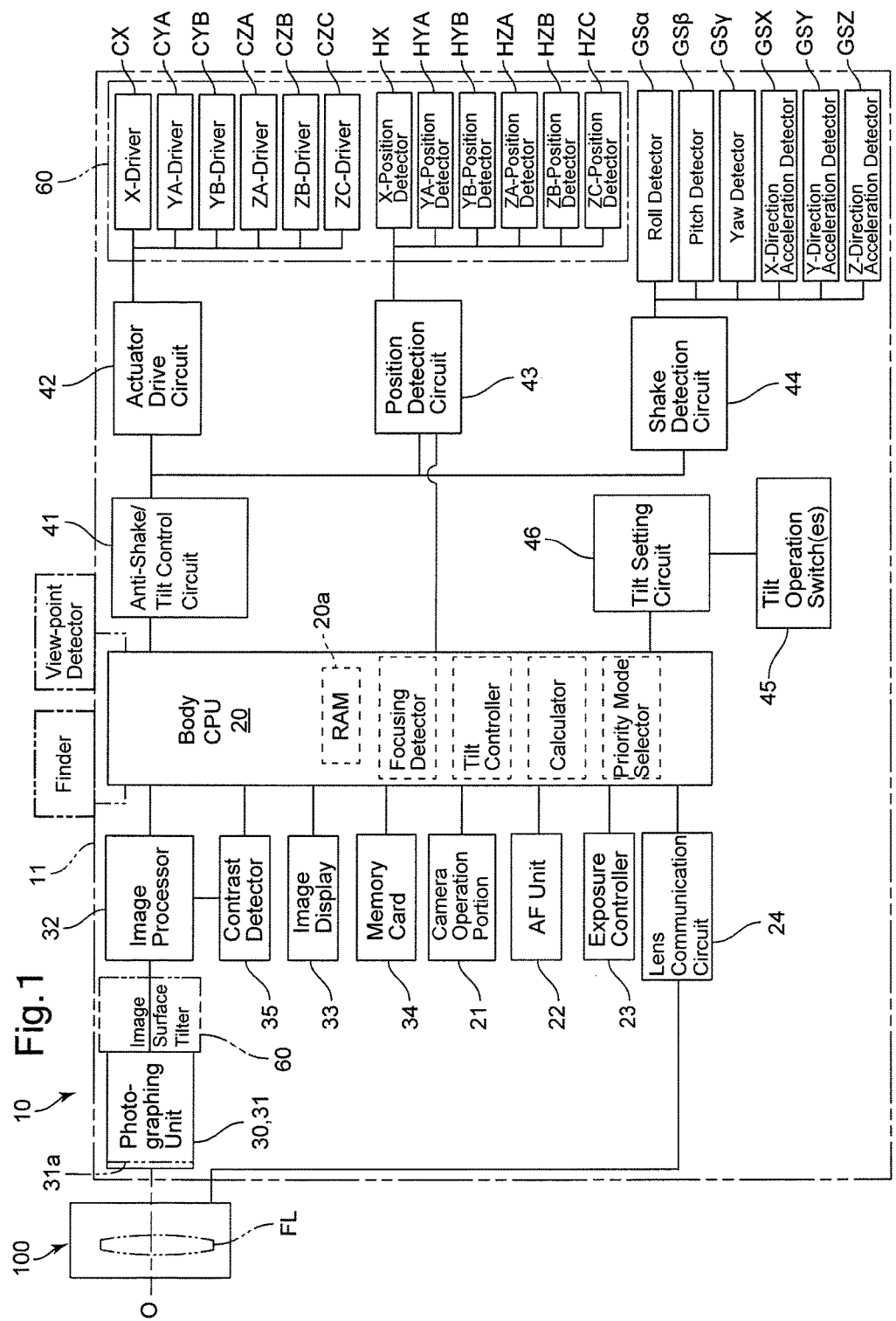

PHOTOGRAPHING APPARATUS

BACKGROUND OF THE INVENTION

1. Field of the Invention

The present invention relates to a photographing apparatus, and in particular relates to a photographing apparatus in which automatic tilt (automatic rotation) of an imaging plane (imaging surface of an image sensor) is possible.

2. Description of the Related Art

In the related art, a method of using voice coil motors that use thin oblong-shaped drive coils is known in the art to be applied to a hand-shake correction device for correcting hand shake that occurs in an SLR (Single Lens Reflex) camera (Patent Literature 1). Furthermore, a hand-shake correction device is also known in the art in which hand-shake correction is possible in a total of six degrees of freedom (6DoF) by tilting an image sensor about two rotational axes, which are mutually orthogonal to each other in a plane that is orthogonal to an optical axis of a photographing lens; by rotating a reflection member that is provided at a midway position in a photographing optical system for folding (bending) an optical path about an axis that is parallel to the optical axis and tilting the reflection member about an axis that is orthogonal to the optical axis; and also by moving a lens group that is positioned midway within the photographing optical system in the optical axis direction (Patent Literature 2).

[Patent Literature 1] Japanese Unexamined Patent Publication No. 2012-226205

[Patent Literature 2] Japanese Unexamined Patent Publication No. 2008-035308

If an object (or object surface, parts of an object, or a plurality of objects positioned approximately on a plane) within a photographing area is tilted relative to the optical axis, an in-focus state can only be achieved on part of the object even if a focusing adjustment is carried out. For example, in a photographic view looking up at a tall building, sometimes the entire building cannot be brought into focus. Furthermore, in the case of photographing scenery at a relatively close distance, and, e.g., the object at a lower part of the picture frame is close and the object at a central to upper part, if the lower part of the picture frame is brought into focus, sometimes the upper part of the picture frame becomes out of focus; conversely, if the upper part of the picture frame is brought into focus, sometimes the lower part of the picture frame becomes out of focus.

Furthermore, in swing-and-tilt photography in which a conventional swing-and-tilt photography interchangeable lens is used, it is necessary for the photographer (user) to manually adjust the swing/tilt amount, which is a troublesome operation.

The hand-shake correcting device of Patent Literature 1 can only move an image sensor in a plane that is orthogonal to the optical axis, and hence, cannot perform swing-and-tilt photography.

In Patent Literature 2, an image sensor (which is included in a configuration of a hand-shake correcting device) is tilted to thereby enable swing-and-tilt photography. However, in the hand-shake correcting device in Patent Literature 2, since there are three members that are driven (controlled), namely, an image sensor, a lens group and a prism (reflection member), the assembly, positional adjustment and control thereof are complicated, so that it is difficult to carry out high-precision swing-and-tilt photography and a high-precision hand-shake correction.

SUMMARY OF THE INVENTION

The present invention has been devised in view of the above described problems, and the present invention provides a photographing apparatus which can bring an entire object into focus even if parts of the object have different object distances, such as an object (or a plane defined by the object) tilted (being inclined) relative to a plane orthogonal to the optical axis of the photographing apparatus, and similarly can bring a plurality of objects into focus even if such objects have different object distances, such as a plurality of objects positioned approximately on a plane that is tilted relative to a plane orthogonal to the optical axis of the photographing apparatus.

According to an aspect of the present invention, a photographing apparatus is provided, including an imaging-plane tilter configured to tilt an imaging plane, formed by a photographing optical system, relative to a plane that is orthogonal to an optical axis of the photographing optical system; a focus detector provided with a plurality of focus detection areas; and a tilt controller configured to control the imaging-plane tilter to tilt the imaging plane based on focus deviation amounts of the plurality of focus detection areas.

It is desirable for the photographing apparatus to include a focus deviation-amount detector configured to detect a focus deviation amount for each of the plurality of focus detection areas; and a focus adjuster configured to drive a focal adjustment optical element to an in-focus position based on at least one of the focus deviation amounts.

It is desirable for the photographing apparatus to include a calculator configured to calculate, based on the focus deviation amounts of the plurality of focus detection areas detected by the focus deviation-amount detector, a tilt correction amount for tilting the imaging plane so that each of the focus deviation amounts become minimum values.

It is desirable for the plurality of focus detection areas to include selection focus detection areas arranged in two mutually orthogonal directions, and selection focus detection areas arranged in at least one diagonal direction that is diagonal to each of the two mutually orthogonal directions. The calculator calculates the tilt correction amount based on focus deviation amounts detected at the selection focus detection areas of at least one the two mutually orthogonal directions and the diagonal direction.

It is desirable for the photographing apparatus to include a manual selector configured to select, via a manual operation, a focus detection area for detecting the focus deviation amount.

It is desirable for the photographing apparatus to include a priority mode selector configured to select one out of a plurality of priority modes, wherein each of the plurality of priority modes prioritize a group of focus detection areas for detecting the focus deviation amounts.

It is desirable for the imaging-plane tilter to include an image sensor, the image sensor provided with a rectangular imaging surface which receives the imaging plane. The priority mode selector is configured to select one priority mode out of at least one of: a horizontal-direction priority mode, which prioritizes the focus detection areas that are arranged in a horizontal direction of the imaging plane; a vertical-direction priority mode, which prioritizes the focus detection areas that are arranged in a vertical direction of the imaging plane; and a diagonal-direction priority mode, which prioritizes the focus detection areas that are arranged in a diagonal direction of the imaging plane that is diagonal to both the horizontal direction and the vertical direction.

It is desirable for the photographing apparatus to include an image sensor configured to capture an object image that is formed through the photographing optical system; and a touch panel display configured to display the object image that is captured by the image sensor. The manual selector selects a focus detection area for detecting the focus deviation amount upon the touch panel display receiving a corresponding touch operation.

It is desirable for the photographing apparatus to include an image sensor configured to capture an object image that is formed through the photographing optical system; and a touch panel display configured to display the object image that is captured by the image sensor. The priority mode selector selects a focus detection area for detecting the focus deviation amount upon the touch panel display receiving a corresponding touch operation.

It is desirable for the photographing apparatus to include an acceleration detector configured to detect a direction of swinging of the photographing apparatus, wherein the priority mode selector selects the priority mode based on a detected direction that is detected by the acceleration detector.

It is desirable for the photographing apparatus to include a finder for viewing an object image, formed through the photographing optical system; and a view-point detector configured to detect a view-point of a user that is viewing through the finder. The manual selector selects a focus detection area that aligns with the view-point detected by the view-point detector.

It is desirable for the photographing apparatus to include a finder for viewing an object image, formed through the photographing optical system; and a view-point detector configured to detect a line-of-vision of a user that is viewing through the finder. The manual selector selects focus detection areas that are arranged in a direction of movement of the view-point detected by the view-point detector.

It is desirable for the photographing apparatus to include a finder for viewing an object image, formed through the photographing optical system; and a view-point detector configured to detect a view-point of a user that is viewing through the finder. The priority mode selector selects a focus detection area that aligns with the view-point detected by the view-point detector.

It is desirable for the photographing apparatus to include a finder for viewing an object image, formed through the photographing optical system; and a view-point detector configured to detect a line-of-vision of a user that is viewing through the finder. The priority mode selector selects focus detection areas that are arranged in a direction of movement of the view-point detected by the view-point detector.

It is desirable for the imaging-plane tilter includes one of an image sensor; and at least one optical element of the photographing optical system. The tilt controller tilts the imaging plane by tilting the one of the image sensor and the optical element relative to a plane that is orthogonal to the optical axis.

It is desirable for the imaging-plane tilter to also be configured to translate the imaging plane in the optical axis direction, wherein the focus adjuster performs a focal adjustment by finely adjusting the imaging plane in the optical axis direction via the imaging-plane tilter.

It is desirable for the focus adjuster to drive the focal adjustment optical element to the in-focus position based on a focus deviation amount of a focus detection area that is located closest to the center of a photographing frame out of the plurality of focus deviation amounts.

It is desirable for the focus deviation-amount detector to include a focus detector that utilizes a phase-difference detection method, in which a focus deviation amount within a focus detection area is detected by detecting a phase difference between a pair of pupil-divided object-emanating light bundles.

According to the photographing apparatus of the present invention, since the imaging surface (imaging plane) can tilt in accordance to the inclination of the object (or object surface, parts of an object, or a plurality of objects positioned approximately on a plane), an entire inclined object (or object surface, parts of an object, or a plurality of objects positioned approximately on a plane) can be easily brought into focus.

The present disclosure relates to subject matter contained in Japanese Patent Application No. 2016-052361 (filed on Mar. 16, 2016) and Japanese Patent Application No. 2017-024754 (filed on Feb. 14, 2017) which are expressly incorporated herein by reference in their entireties.

BRIEF DESCRIPTION OF THE DRAWINGS

The present invention will be described below in detail with reference to the accompanying drawings in which:

FIG. 1 is a block diagram illustrating main components of a digital camera provided with an imaging apparatus, of the present invention, which incorporates a stage apparatus;

DESCRIPTION OF THE EMBODIMENTS

Figure 2A:
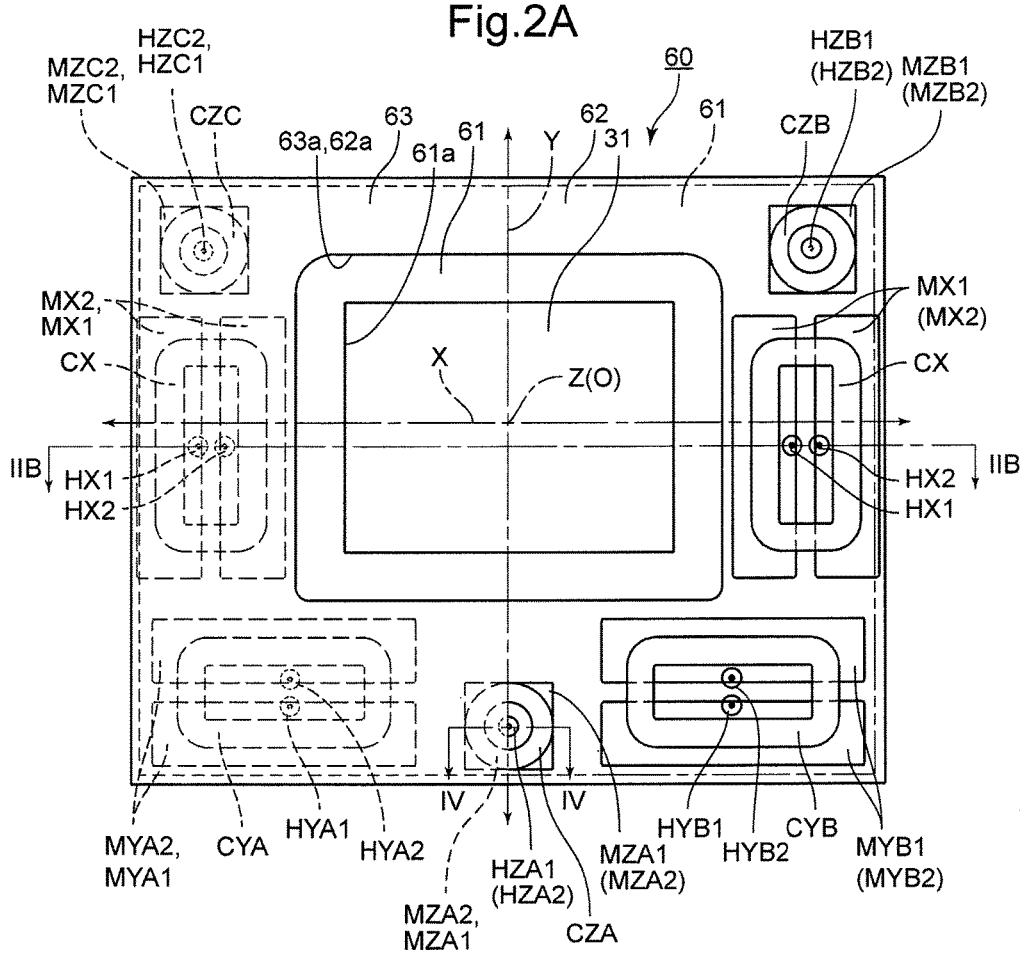
FIG. 2A is a rear elevational view of an embodiment of the stage apparatus with six degrees of freedom according to the present invention, wherein a rear yoke and a movable stage are not shown in a right half of FIG. 2A.

Embodiments of the present invention will be hereinafter discussed with reference to FIGS. 1 through 14. FIG. 1 is a conceptual block diagram of main components and main circuit elements of a digital camera provided with an imaging apparatus, of the present invention, which incorporates a stage apparatus. In the diagram of FIG. 1, the direction parallel to a photographing optical axis O (which includes the concept of the direction aligned with the photographing optical axis O) is defined as the first direction (Z-direction/Z-axis), a direction orthogonal to the first direction is defined as the second direction (X-direction/X-axis direction), and a direction orthogonal to both the first direction (Z-direction) and the second direction (X-direction) is defined as the third direction (Y-direction/Y-axis direction). When the photographing optical axis O is defined as the Z-axis, two axes orthogonal to the Z-axis are regarded as the X-axis and the Y-axis. When the camera is in a normal position (horizontal position), the first direction (Z-direction/Z-axis) and the second direction (X-direction/X-axis) are defined as horizontal directions and the third direction (Y-direction/Y-axis) is defined as a vertical direction, and the object side and the direction toward the object defines a front side (of the imaging apparatus) and the forward direction, respectively. Furthermore, in the present disclosure, rotation about the Z-direction (first direction) refers to rotation about an imaginary axis that is parallel to the Z-axis. Similarly, rotation about the X-direction (second direction) refers to rotation about an imaginary axis that is parallel to the X-axis, and rotation about the Y-direction (third direction) refers to rotation about an imaginary axis that is parallel to the y-axis. Additionally, in the present specification, turning (rotation) about an imaginary axis in the first direction denotes turning with an imaginary axis parallel to (extending in) the first direction as a rotational center, tilting (rotation) about an imaginary axis in the second direction denotes tilting with an imaginary axis parallel to (extending in) the second direction as a rotational center, and tilting (rotation) about an imaginary axis in the third direction denotes tilting with an imaginary axis parallel to (extending in) the third direction as a rotational center.

The digital camera 10 is provided with a camera body 11 and a photographic lens 100 as a photographing optical system. The digital camera 10 is provided in the camera body 11 with a body CPU (tilt controller/calculator/priority mode selector) 20 and an imaging unit 30. The body CPU 20 controls the overall operations of the camera, performs computational and arithmetic operations, and controls driving of the camera 10. The imaging unit 30 is provided with an image sensor (image pickup device) 31 which captures an object image made incident thereon via the photographic lens 100. The body CPU 20 controls driving of the image sensor 31, processes image signals of captured object images at an image processor 32 to display the captured object images on an image display (monitor) 33, and writes data of the captured object images onto a memory card 34.

The digital camera 10 is provided with a contrast detector 35, a camera input device 21, an AF Unit (focus adjuster) 22, an exposure controller 23 and a lens communication circuit 24. The contrast detector 35 detects the contrast of an object image from the image signal processed by the image processor 32. The camera input device 21 includes, e.g., control switches, buttons, a dial (s) and/or a touchscreen, which are manually operated by the user to operate all the functions of the camera. The AF Unit 22 drives a focal adjustment lens group (focus adjustment optical element) FL, contained in the photographic lens 100, in the optical axis direction (the direction along the optical axis O) to adjust the focus. The exposure controller 23 controls opening and closing operations of a diaphragm, a shutter, etc., to adjust the quantity of light incident on the image sensor 31 and drives the image sensor 31 to control imaging operations. The lens communication circuit 24 performs communications with the photographic lens 100 to input lens information such as the focal length f, etc., of the photographic lens 100.

The digital camera 10 is provided with a roll detector GSα (which detects turning (rotation) about an imaginary axis in the Z-direction), a pitch detector GSβ (which detects tilt (rotation) about an imaginary axis in the X-direction), a yaw detector GSγ (which detects tilt (rotation) about an imaginary axis in the Y-direction), an X-direction acceleration detector GSX, a Y-direction acceleration detector GSY and a Z-direction acceleration detector GSZ as detectors for detecting shaking (vibrations) of the camera body 11 that is caused by hand shake; each of these six detectors are connected to a camera shake detecting circuit 44. These six detectors can be provided as a combined sensor, e.g., a six-axis sensor, a triple-axis gyro sensor, or a triple-axis acceleration sensor.

The imaging unit 30 is provided with a stage apparatus 60. The stage apparatus 60 is provided with a movable stage (imaging-plane rotator) 61, a front fixed yoke 62 and a rear fixed yoke 63. The image sensor 31 is fixedly mounted to the movable stage 61, and the front fixed yoke 62 and the rear fixed yoke 63 are positioned in front of and behind the movable stage 61, respectively. The stage apparatus 60 levitationally supports the movable stage 61 (so that the movable stage 61 is magnetically levitated) relative to the front fixed yoke 62 and the rear fixed yoke 63 at least when energized. The image sensor 31 constitutes a low-profile driven member having a flat front surface. In a levitational state, the movable stage 61 of the stage apparatus 60 can translate (linearly move) in the Z-direction (the first direction), translate in the X-direction (second direction) which is orthogonal to the Z-direction, translate in the Y-direction (third direction) which is orthogonal to both the X-direction and the Z-direction, tilt (rotate) about the X-direction (second direction), tilt (rotate) about the Y-direction (third direction), and turn (rotate) about the Z-direction (first direction) to thereby exhibit six axes of motion/motion with six degrees of freedom (6DoF) (see FIGS. 2 through 5).

Accordingly, the movable stage 61 of the stage apparatus 60 can translate, rotate, translate while rotating, translate after rotating, rotate after translating, and/or perform a combination of such translating and rotating operations. In the present disclosure, the term "translate" refers to moving along at least one of the X-direction, Y-direction and Z-direction without changing either the orientation or angular displacement of the image plane, corresponding to the light-receiving surface of the image sensor 31 provided on the movable stage, relative to the camera body 11, the term "tilt" refers to rotating about at least one of the X-direction and Y-direction to change the orientation of the image plane relative to the camera body 11, and the term "turn" refers to rotating about the Z-direction so that the image plane rotates about the optical axis O. In addition, the term "levitation" includes the concept of holding the movable stage 61 between the front fixed yoke 62 and the rear fixed yoke 63 in a noncontact state with the front fixed yoke 62 and the rear fixed yoke 63 and the concept of holding the movable stage 61 between the front fixed yoke 62 and the rear fixed yoke 63 in a noncontact state with the front fixed yoke 62 and the rear fixed yoke 63 at a center position (imaging initial position) where the center of the image sensor 31 is coincident with the optical axis O (the Z-axis).

The body CPU 20 inputs information on the focal length f from the photographic lens 100 via, e.g., the lens communication circuit 24, calculates the vibration direction, the vibration speed, etc., of the digital camera 10 based on detection signals input from the pitch (tilt (rotation) about an imaginary axis in the X-direction) detector GSβ, the yaw (tilt (rotation) about an imaginary axis in the Y-direction) detector GSγ, the roll (turn (rotation) about an imaginary axis in the Z-direction) detector GSα, the X-direction acceleration detector GSX, the Y-direction acceleration detector GSY and the Z-direction acceleration detector GSZ, calculates the driving direction, the driving speed and the driving amount of the image sensor 31 so that the object image projected onto the image sensor 31 via the photographic lens 100 does not move relative to the image sensor 31 and drives the movable stage 61 of the stage apparatus 60 in with six degrees of freedom (6DoF) (six-axis motion), i.e., translate (shift) the movable member in the X-direction, the Y-direction and/or the Z-direction, tilt (rotate) the movable member about the X-direction and/or the Y-axis, and/or turn (rotate) the movable member about the Z-direction, based on the calculation results. For example, the movable stage 61 can translate (shift), rotate (tilt or turn), translate (shift) while rotating, translate (shift) after rotating, and rotating after translation (shifting). The order of these movements is optional.

The stage apparatus 60 functions as a supporter which supports the movable stage 61, to which the image sensor 31 is fixed, in a manner to allow the movable stage 61 to translate and rotate (tilt or turn) with six degrees of freedom (6DoF) with respect to the front fixed yoke 62 and the rear fixed yoke 63. The movable stage 61 is a rectangular plate (frame) and greater in size than the image sensor 31 as viewed from the front. The front fixed yoke 62 and the rear fixed yoke 63 are rectangular plates (frames) of the same size and have slightly greater outer dimensions than those of the movable stage 61 in a plan view. The front fixed yoke 62 and the rear fixed yoke 63 are provided at the centers thereof with rectangular openings 62*a* and 63*a*, respectively, which have greater dimensions than the outer dimensions of the image sensor 31 as viewed from front (as viewed in the Z-direction). The front fixed yoke 62 and the rear fixed yoke 63 are connected and held in parallel with each other with a predetermined distance therebetween via a plurality of connecting columns (not shown) at positions not interfering with the movable stage 61 even when the movable stage 61 is moved (translated, tilted or turned) within a predetermined range.

Figure 2B:
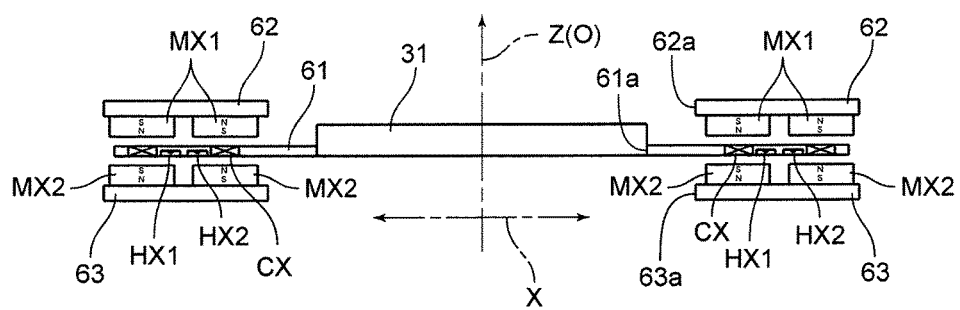
FIG. 2B is a sectional view taken along the section line IIB-IIB shown in FIG. 2A.
Figure 3:
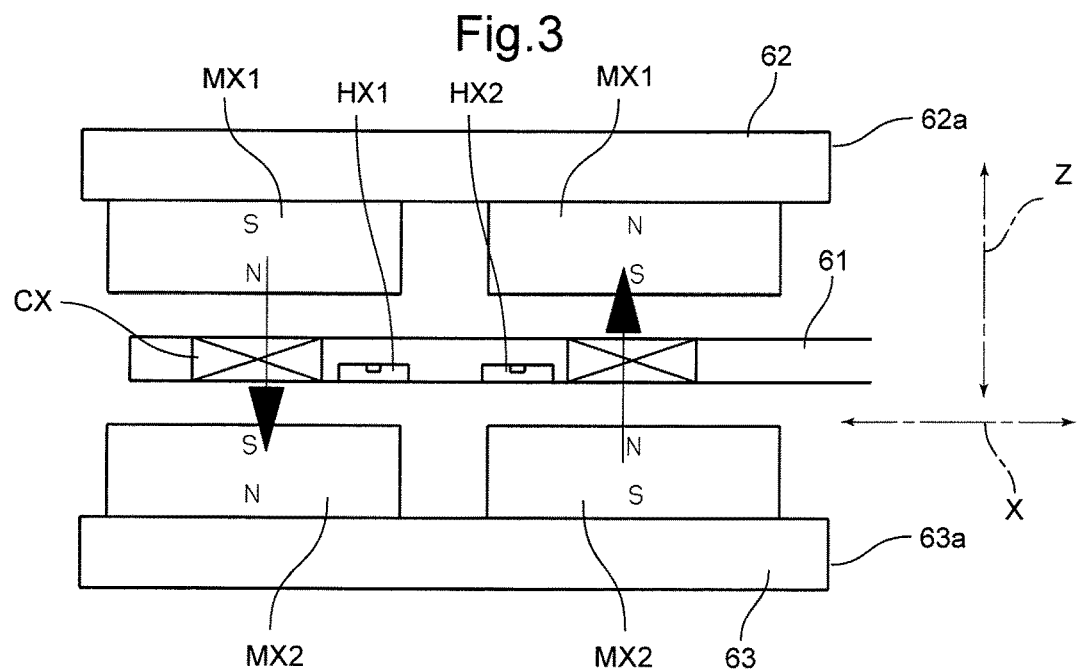
FIG. 3 is an enlarged sectional view of one of a pair of X-drivers shown in FIG. 2B.
Figure 4:
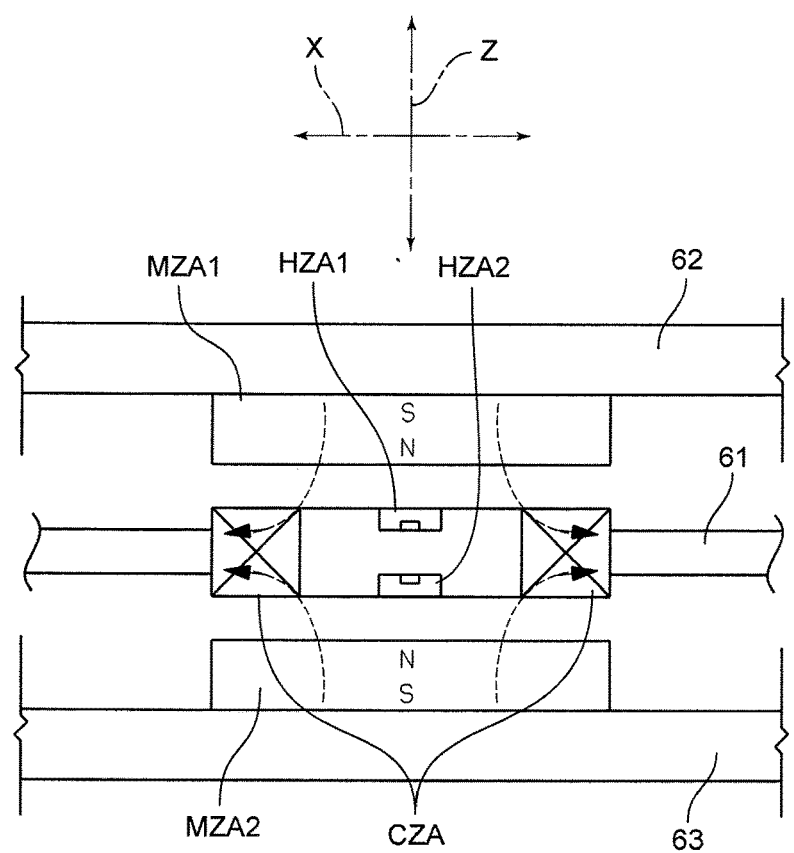
FIG. 4 is an enlarged sectional view taken along the section line IV-IV shown in FIG. 2A.
Figure 5:
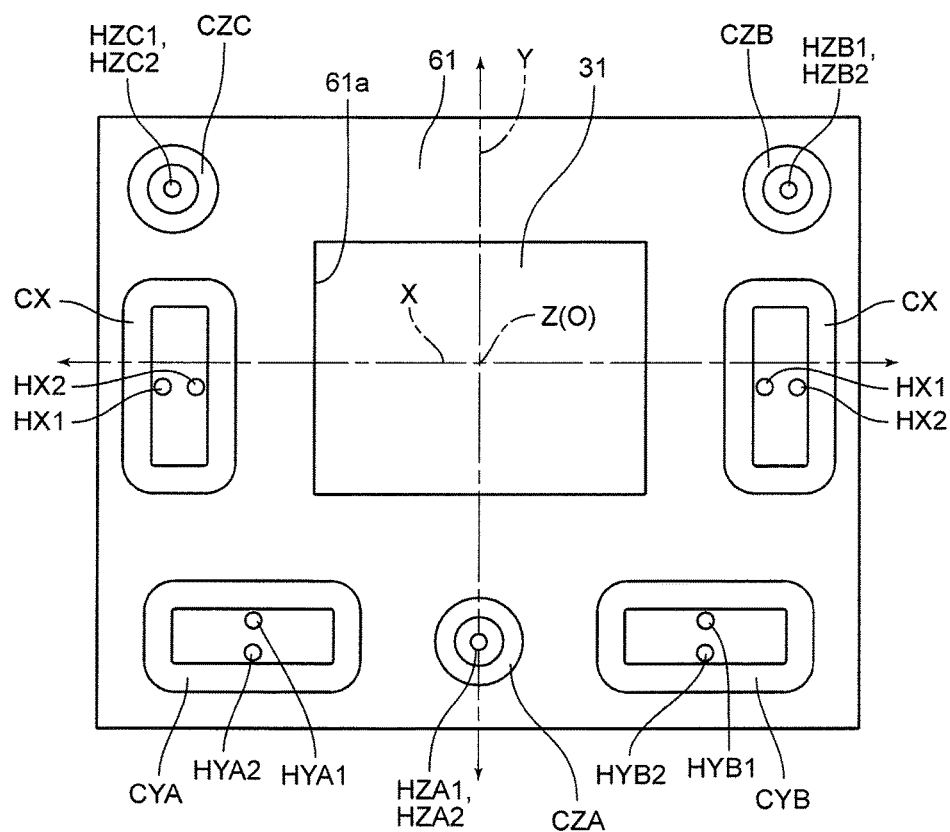
FIG. 5 is a rear elevational view of the movable stage.

The stage apparatus 60 is provided with a left pair of X-direction magnets (second-direction magnets/left and right X-direction magnets) MX1 and a right pair of X-direction magnets (second-direction magnets/left and right X-direction magnets) MX1, each pair being made of two permanent magnets identical in specification. The left pair of X-direction magnets MX1 and the right pair of X-direction magnets MX1 are fixed to the rear of the front fixed yoke 62 (the opposite side of the front fixed yoke 62 from the object side) to be positioned on either side of the opening 62*a* with respect to the leftward and rightward directions (on either side of the Z-axis with the Y-axis as a center line). Although the stage apparatus 60 is provided with the two pairs of X-direction magnets MX1 on either side of the opening 62*a* in the X-direction in the present embodiment of the stage apparatus, it is possible for the two pairs of X-direction magnets MX1 to be provided only on one side of the opening 62*a* with respect to the X-direction. The stage apparatus 60 is provided with a left pair of X-direction magnets MX2 and a right pair of X-direction magnets MX2 which are fixed to the front of the front fixed yoke 63 (the object side surface of the front fixed yoke 63) to face the left pair of X-direction magnets MX1 and the right pair of X-direction magnets MX1, respectively. Each pair of X-direction magnets MX2 is identical in specification to each pair of X-direction magnets MX1. Each X-direction magnet MX1 and MX2 is a plate-like magnet which is elongated in the Y-direction and thin in the Z-direction. The left and right X-direction magnets MX1 of each pair are arranged parallel to the Y-axis and spaced from each other in the X-direction; likewise, the left and right X-direction magnets MX2 of each pair are arranged parallel to the Y-axis and spaced from each other in the X-direction. In each pair of X-direction magnets MX1, the front and the rear sides of one X-direction magnet MX1 (the left X-direction magnet MX1 with respect to FIG. 2B) are the north pole and the south pole, respectively, while the front and the rear sides of the other X-direction magnet MX1 (the right X-direction magnet MX1 with respect to FIG. 2B) are the south pole and the north pole, respectively. Each pair of X-direction magnets MX2 are positioned with respect to the associated pair of X-direction magnets MX1 so that opposite magnetic poles are placed face-to-face in the Z-direction as shown in FIGS. 2B and 3. With the passage of magnetic flux of each pair of X-direction magnets MX1 and the associated pair of X-direction magnets MX2 through the front fixed yoke 62 and the rear fixed yoke 63, a portion of a magnetic circuit which generates thrust in the X-direction (the second direction) is formed between each pair of X-direction magnets MX1 and the associated pair of X-direction magnets MX2 (see FIG. 3).

The stage apparatus 60 is provided with a left pair of Y-direction magnets (upper and lower Y-direction magnets) MYA1 and a right pair of Y-direction magnets (upper and lower Y-direction magnets) MYB1, each pair being made of two permanent magnets identical in specification. The left pair of Y-direction magnets MYA1 and the right pair of Y-direction magnets MYB1 are fixed to the rear of the front fixed yoke 62 to be positioned below the opening 62*a* (to be spaced downward from the Z-axis with the Y-axis as a center line). The stage apparatus 60 is further provided with a left pair of Y-direction magnets (upper and lower Y-direction magnets) MYA2 and a right pair of Y-direction magnets (upper and lower Y-direction magnets) MYB2, each pair being made of two permanent magnets identical in specification. The left pair of Y-direction magnets MYA2 and the right pair of Y-direction magnets MYB2 are fixed to the front of the rear fixed yoke 63 to face the left pair of Y-direction magnets MYA1 and the right pair of Y-direction magnets MYB1, respectively. Each Y-direction magnet MYA1, MYB1, MYA2 and MYB2 is a plate-like magnet which is elongated in the X-direction and thin in the Z-direction. The upper and lower Y-direction magnets MYA1 are arranged parallel to the X-axis and spaced from each other in the Y-direction and the upper and lower Y-direction magnets MYB1 are arranged parallel to the X-axis and spaced from each other in the Y-direction. Likewise, the upper and lower Y-direction magnets MYA2 are arranged parallel to the X-axis and spaced from each other in the Y-direction and the upper and lower Y-direction magnets MYB2 are arranged parallel to the X-axis and spaced from each other in the Y-direction. In each pair of Y-direction magnets MYA1 and MYB1, the front and the rear of one Y-direction magnet MYA1 or MYB1 (the upper Y-direction magnet MYA1 or MYB1 with respect to FIG. 2A) are the south pole and the north pole, respectively, while the front and the rear of the other Y-direction magnet MYA1 or MYB1 (the lower Y-direction magnet MYA1 or MYB1 with respect to FIG. 2A) are the north pole and the south pole, respectively. Each pair of Y-direction magnets MYA2 and MYB2 are positioned with respect to the associated pair of Y-direction magnets MYA1 and MYA2 so that opposite magnetic poles are placed face-to-face in the Z-direction. With the passage of magnetic flux of each pair of Y-direction magnets MYA1 and the associated pair of Y-direction magnets MYA2 through the front fixed yoke 62 and the rear fixed yoke 63, a portion of a magnetic circuit which generates thrust in the Y-direction (the third direction) is formed between each pair of Y-direction magnets MYA1 and the associated pair of Y-direction magnets MYA2.

The stage apparatus 60 is further provided on the rear of the front fixed yoke 62 with three Z-direction magnets MZA1, MZB1 and MZC1 (see FIG. 2A), at three positions different from the positions of the left pair of X-direction magnets MX1, the right pair of X-direction magnets MX1, the left pair of Y-direction magnets MYA1 and the right pair of Y-direction magnets MYB1. The stage apparatus 60 is provided on the front of the rear fixed yoke 63 with three Z-direction magnets MZA2, MZB2 and MZC2.

Each Z-direction magnet MZA1, MZB1, MZC1, MZA2, MZB2 and MZC2 is a plate-like magnet which is rectangular (substantially square) in shape as viewed from the front. The Z-direction magnets MZA1, MZB1 and MZC1 are fixed to the rear side of the front fixed yoke 62 so that the front side (that is in contact with the front fixed yoke 62) and the rear side of each Z-direction magnet act as the south pole and the north pole, respectively (i.e., the south and north poles of each Z-direction magnet face forward and rearward, respectively), while the Z-direction magnets MZA2, MZB2 and MZC2 are fixed to the front of the rear fixed yoke 63 so that the same magnetic poles are placed face-to-face between each Z-direction magnet MZA2, MZB2 and MZC2 and the associated Z-direction magnet MZA1, MZB1 or MZC1. The Z-direction magnets MZA1, MZB1, MZC1, MZA2, MZB2 and MZC2 are identical in specification. In addition, the Z-direction magnets MZA1, MZB1 and MZC1 lie in a plane (first plane) orthogonal to the Z-axis and are arranged at substantially equi-angular intervals about the Z-axis. Likewise, the Z-direction magnets MZA2, MZB2 and MZC2 lie in a plane (second plane parallel to the aforementioned first plane) orthogonal to the Z-axis and are arranged at substantially equi-angular intervals about the Z-axis to face the Z-direction magnets MZA1, MZB1 and MZC1 in the Z-direction, respectively. With the passage of magnetic flux of each Z-direction magnet MZA1, MZB1 and MZC1 and the associated Z-direction magnet MZA2, MZB2 or MZC2 through the front fixed yoke 62 and the rear fixed yoke 63, a portion of a magnetic circuit which generates thrust in the Z-direction (the first direction) is formed between each Z-direction magnet MZA1, MZA2 and MZA3 and the associated Z-direction magnet MZB1, MZB2 or MZBC.

The movable stage 61, which is positioned between the front fixed yoke 62 and the rear fixed yoke 63, is a non-magnetic member which is formed of a nonmagnetic material as a single-piece member by press-molding. The movable stage 61 is provided at a central portion thereof with an image sensor mounting hole 61a, having the shape of a rectangle as viewed from the front, and the image sensor 31 is fitted into the image sensor mounting hole 61a and fixed thereto. The image sensor 31 protrudes from the image sensor mounting hole 61a forwardly toward the front of the movable stage 61 in the optical axis direction.

When the movable stage 61 sits at the initial position (with the movable stage 61 magnetically levitated), the image sensor 31 is positioned so that the long sides of the image sensor 31 extend parallel to the X-axis and so that the short sides of the image sensor 31 extend parallel to the Y-axis. When the movable stage 61 sits at the initial position, the center of the imaging surface of the image sensor 31 is positioned on the optical axis O of the photographic lens 100, and the optical axis O and the Z-axis are aligned with each other. The Z-direction (the first direction), the X-direction (the second direction) and the Y-direction (the third direction) will be hereinafter described as fixed directions with respect to the camera body 11 and the photographic lens 100, with the Z-direction parallel to (including being aligned with) the optical axis O; however, the Z-direction (the first direction), the X-direction (the second direction) and the Y-direction (the third direction) can be fixed directions with respect to the image sensor 31.

The stage apparatus 60 is provided with a pair of X-drive coils (X-driver) CX which are fixed to the movable stage 61 on either side (left and right sides) of the image sensor 31 in the X-direction to be located to the left and right of the left and right sides (short sides) of the image sensor 31, respectively. The stage apparatus 60 is provided with a pair of Y-drive coils: a Y-drive coil (YA-driver) CYA and a Y-drive coil (YB-driver) CYB which are fixed to the movable stage 61 to be located below the lower side (long side) of the image sensor 31 and to be spaced from each other in the leftward and rightward directions (i.e., in the X-direction). The pair of X-drive coils (X-driver) CX are vertically elongated in the Y-direction and arranged at symmetrical positions with respect to the Y-axis (at equi-distant positions from the Y-axis) so that the longitudinal directions of the pair of X-drive coils CX extend parallel to the Y-direction and intersect the X-axis. The pair of Y-drive coils CYA and CYB are laterally elongated in the X-direction and arranged at symmetrical positions with respect to the Y-axis (at equi-distant positions from the Y-axis) so that the longitudinal directions of the pair of Y-drive coils CYA and CYB extend parallel to the X-direction. According to this arrangement, manufacture, adjustment and control of the stage apparatus 60 is facilitated.

The stage apparatus 60 is further provided with three circular coils: a Z-drive coil (ZA-driver) CZA, a Z-drive coil (ZB-driver) CZB and a Z-drive coil (ZC-driver) CZC which are fixed to the movable stage 61. The Z-drive coil CZA is fixed at a position (middle position) between the pair of Y-drive coils CYA and CYB, and the Z-drive coils CZB and CZC are fixed above the pair of X-drive coils CX, respectively. The Z-drive coil CZA is arranged on the Y-axis, and the Z-drive coils CZB and CZC are arranged to be symmetrical with respect to the Y-axis (at equi-distant positions from the Y-axis). The center of gravity (the center of gravity of the whole) of the Z-drive coils CZA, CZB and CZC is substantially coincident with the center of gravity of the movable stage 61. It is desirable that the Z-drive coils CZA, CZB and CZC be arranged so that a line which connects two of the three Z-drive coils CZA, CZB and CZC extends parallel to one of the X-axis and the Y-axis and so that a line which extends from the remaining one of the three Z-drive coils CZA, CZB and CZC and is orthogonal to the aforementioned connecting line extends parallel to (or aligns with) the other of the X-axis and the Y-axis. In the first embodiment of the stage apparatus, the Z-drive coils CZA, CZB and CZC are arranged so that a line which connects the two Z-drive coils CZB and CZC extends parallel to the X-axis and so that a line which extends from the Z-drive coil CZA and is orthogonal to the aforementioned connecting line aligns with the Y-axis as shown in FIG. 2A. According to this arrangement, manufacture, adjustment and control of the stage apparatus 60 is facilitated.

The pair of X-drive coils CX, the pair of Y-drive coils CYA and CYB and the three Z-drive coils CZA, CZB and CZC are flat (thin) coils which are arranged to be parallel to a plane (X-Y plane) orthogonal to the optical axis O. Each of these seven flat coils is made of a plurality of turns of a conductive wire wound in the X-Y plane which are in turn multi-layered in the thickness direction of the movable stage 61 (i.e., in the Z-direction).

The pair of X-drive coils CX are arranged so that the long portions (long sides) thereof extend parallel to the Y-axis and so that the front and rear surfaces of each X-drive coil CX face the pair of X-direction magnets MX1 and the pair of X-direction magnets MX2, respectively, while the pair of Y-drive coils CYA and CYB are arranged so that the long portions (long sides) thereof extend parallel to the X-axis, so that the front and rear surfaces of the Y-drive coil CYA face the pair of Y-direction magnets MYA1 and the pair of Y-direction magnets MYA2, respectively, and so that the front and rear surfaces of the Y-drive coil CYB face the pair of Y-direction magnets MYB1 and the pair of X-direction magnets MYB2, respectively.

The pair of X-drive coils (X-driver) CX, the Y-drive coil (YA-driver) CYA, the Y-drive coil (YB-driver) CYB, the Z-drive coil (ZA-driver) CZA, the Z-drive coil (ZB-driver) CZB and the Z-drive coil (ZC-driver) CZC are all connected to an actuator drive circuit 42 (see FIG. 1), and the passage of electric current through each of these seven coils is controlled via the actuator drive circuit 42.

Each X-drive coil CX and the associated front and rear pairs of X-direction magnets MX1 and MX2 constitute a second thrust generator which generates thrust in the X-direction (the second direction). The movable stage 61 can be translated in the X-direction by the thrust force in the X-direction which is generated by controlling the current through the pair of X-drive coils CX. Each X-drive coil CX and the associated X-direction magnets MX1 and MX2 also act (function) as a levitator which levitates and holds the movable stage 61 at a center position (initial position) regardless of the attitude of the camera body 11, e.g., when the camera is held in a vertical position in which the grip of the camera body 11 faces up or down, or at an inclined angle other than a horizontal position.

The Y-drive coil CYA and the associated front and rear pairs of Y-direction magnets MYA1 and MYA2, and the Y-drive coil CYB and the associated front and rear pairs of Y-direction magnets MYB1 and MYB2 constitute a pair of third thrust generators (thrust controllers), each of which generates thrust in the Y-direction (the third direction). The movable stage 61 can be translated in the Y-direction and turned (rotated) about an imaginary axis in the Z-direction by interaction of two thrust forces in the Y-direction which are generated by controlling the currents through the pair of Y-drive coils CYA and CYB, spaced from each other in the X-direction. The Y-drive coil CYA and the pair of Y-direction magnets MYA1 and MYA2, and the Y-drive coil CYB and the pair of Y-direction magnets MYB1 and MYB2 also act (function) as a levitator which levitates and holds the movable stage 61 at a center position (initial position) regardless of the attitude of the camera body 11, and especially when the camera is held in a normal position (horizontal position).

The three Z-drive coils CZA, CZB and CZC are arranged so that the front and rear surfaces of the Z-drive coil CZA face the front and rear Z-direction magnets MZA1 and MZA2, respectively, so that the front and rear surfaces of the Z-drive coil CZB face the front and rear Z-direction magnets MZB1 and MZB2, respectively, and so that the front and rear surfaces of the Z-drive coil CZC face the front and rear Z-direction magnets MZC1 and MZC2, respectively. The Z-drive coil CZA and the front and rear Z-direction magnets MZA1 and MZA2, the Z-drive coil CZB and the front and rear Z-direction magnets MZB1 and MZB2, and the Z-drive coil CZC and the front and rear Z-direction magnets MZC1 and MZC2 constitute three first thrust generators, each of which generates thrust in the Z-direction (the first direction). The movable stage 61 is levitated without contacting either the front fixed yoke 62 or the rear fixed yoke 63 (without contacting any of the three pairs of Z-direction magnets MZA1 and MZA2, MZB1 and MZB2, and MZC1 and MZC2), translated in the Z-direction, tilted about the X-direction and tilted about the Y-direction by interaction of three thrust forces in the Z-direction which are generated by controlling the currents through the three Z-drive coils CZA, CZB and CZC.

The Z-drive coils CZA, CZB and CZC and the pairs of Z-direction magnets MZA1 and MZA2, MZB1 and MZB2, and MZC1 and MZC2 also act (function) as a levitator which levitates and holds the movable stage 61 at an initial position relative to the optical axis direction and at an initial attitude (at an initial position in which the imaging surface of the image sensor 31 is orthogonal to the optical axis O).

The stage apparatus 60 is provided with two pairs of X-direction Hall elements (magnetic sensors), two pairs of Y-direction Hall elements (magnetic sensors) and three pairs of Z-direction Hall elements (magnetic sensors). More specifically, the stage apparatus 60 is provided with a left pair of X-direction Hall elements HX1 and HX2 (X-position detector HX), a right pair of X-direction Hall elements HX1 and HX2 (X-position detector HX), a left pair of Y-direction Hall elements HYA1 and HYA2 (YA-position detector HXA), a right pair of Y-direction Hall elements HYB1 and HYB2 (YA-position detector HXB), a pair of Z-direction Hall elements HZA1 and HZA2 (ZA-position detector), a pair of Z-direction Hall elements HZB1 and HZB2 (ZB-position detector) and a pair of Z-direction Hall elements HZC1 and HZC2 (ZC-position detector). These Hall elements HX1, HX2, HYA1, HYA2, HYB1, HYB2, HZA1, HZA2, HZB1, HZB2, HZC1 and HZC2 are all fixed to the movable stage 61. The left pair of X-direction Hall elements HX1 and HX2 are positioned in the air-core area of the left X-drive coil CX, and the right pair of X-direction Hall elements HX1 and HX2 are positioned in the air-core area of the right X-drive coil CX. The left pair of Y-direction Hall elements HYA1 and HYA2 are positioned in the air-core area of the left Y-drive coil CYA, and the right pair of Y-direction Hall elements HYB1 and HYB2 are positioned in the air-core area of the right Y-drive coil CYB. The pair of Z-direction Hall elements HZA1 and HZA2 are positioned in the air-core area of the Z-drive coil CZA, the pair of Z-direction Hall elements HZB1 and HZB2 are positioned in the air-core area of the Z-drive coil CZB, and the pair of Z-direction Hall elements HZC1 and HZC2 are positioned in the air-core area of the Z-drive coil CZC. Each pair of X-direction Hall elements HX1 and HX2 are positioned at an approximate center of the associated X-drive coil CX in the Y-direction (the short-side direction of the image sensor 31) and spaced from each other with a predetermined distance therebetween in the X-direction (the long-side direction of the image sensor 31). Each pair of Y-direction Hall elements HYA1 and HYA2, and HYB1 and HYB2 are positioned at an approximate center of the associated Y-drive coil CYA or CYB in the X-direction (the long-side direction of the image sensor 31) and spaced from each other with a predetermined distance therebetween in the Y-direction (the short-side direction of the image sensor 31). Each pair of Z-direction Hall elements HZA1 and HZA2, HZB1 and HZB2, and HZC1 and HZC2 are positioned to lie on the axis of the associated Z-drive coil CZA, CZB or CZC and spaced from each other with a predetermined distance therebetween in the Z-direction.

Each pair of X-direction Hall elements HX1 and HX2 (X-position detector HX), each pair of Y-direction Hall elements HYA1 and HYA2 (YA-position detector HXA) and HYB1 and HYB2 (YA-position detector HXB) and each pair of Z-direction Hall elements HZA1 and HZA2 (ZA-position detector HZA), HZB1 and HZB2 (ZB-position detector HZB) and HZC1 and HZC2 (ZC-position detector HZC) are all connected to a position detection circuit 43 (see FIG. 1).

Each pair of X-direction Hall elements HX1 and HX2 constitute an X-direction position detector (translation-direction position detector) which detects the magnetic force (magnetic flux of an X-direction magnetic circuit) of the associated pairs of X-direction magnets MX1 and MX2 to detect the position of the movable stage 61 in the X-direction (the translation direction position in the X-direction) based on detection signals output from the X-direction Hall elements HX1 and HX2.

The pair of Y-direction Hall elements HYA1 and HYA2 detects the magnetic force of the associated pairs of Y-direction magnets MYA1 and MYA2 (magnetic flux of a Y-direction magnetic circuit), and the pair of Y-direction Hall elements HYB1 and HYB2 detects the magnetic force of the associated pairs of Y-direction magnets MYB1 and MYB2 (magnetic flux of a Y-direction magnetic circuit). Subsequently, the position of the movable stage 61 in the Y-direction and the turning position (rotational position) of the movable stage 61 about the Z-direction are detected based on detection signals output from the Y-direction Hall elements HYA1 and HYA2 and detection signals output from the Y-direction Hall elements HYB1 and HYB2. Accordingly, the pair of Y-direction Hall elements HYA1 and HYA2 and the pair of Y-direction Hall elements HYB1 and HYB2 each constitute a Y-direction position detector (translation direction position detector) which detects the position of the movable stage 61 in the Y-direction (the translation direction position of the movable stage 61 in the Y-direction) and a turning position (rotational position) detector which detects the turning position of the movable stage 61 about the Z-direction.

Each pair of Z-direction Hall elements HZA1 and HZA2, HZB1 and HZB2, and HZC1 and HZC2 detect the magnetic force of the associated pair of Z-direction magnets MZA1 and MZA2, MZB1 and MZB2, or MZC1 and MZC2 (magnetic flux of a Z-direction magnetic circuit) to detect the position of the movable stage 61 in the Z-direction (the translation direction position in the Z-direction), the tilting position of the movable stage 61 about the X-direction and the tilting position of the movable stage 61 about the Y-direction based on detection signals output from the three pairs of Z-direction Hall elements HZA1 and HZA2, HZB1 and HZB2, and HZC1 and HZC2. Accordingly, the three pairs of Z-direction Hall elements HZA1 and HZA2, HZB1 and HZB2, and HZC1 and HZC2 constitute both a Z-direction position detector (translation direction position detector) which detects the position of the movable stage 61 in the Z-direction (the translation direction position in the Z-direction), a tilting position detector which detects the tilting position of the movable stage 61 about the X-direction and a tilting position detector which detects the tilting position of the movable stage 61 about the Y-direction.

The X-drive coils CX, the Y-drive coils CYA and CYB and the Z-drive coils CZA, CZB and CZC, the X-direction Hall elements HX (Hx1 and Hx2), the Y-direction Hall elements HYA (HYA1 and HYA2) and HYB (HYB1 and HYB2), and the Z-direction Hall elements HZA (HZA1 and HZA2), HZB (HZB1 and HZB2) and HZC (HZC1 and HZC2) are all mounted on a flexible printed circuit (FPC) board (not shown) and are electrically connected to a circuit incorporated in the camera body 11 such as the actuator drive circuit 42 or the position detection circuit 43 via a flexible printed wiring board (flexible PWB) (not shown) which extends from the movable stage 61 (see FIG. 1).

The actuator drive circuit 42 controls energization of the pair of X-drive coils CX, the pair of Y-drive coils CYA and CYB, and the three Z-drive coils CZA, CZB and CZC. The operation of the actuator drive circuit 42 is controlled by the body CPU 20 via an anti-shake/tilt control circuit 41 which is connected between the body CPU 20 and the actuator drive circuit 42 as shown in FIG. 1.

The position detection circuit 43 detects the positions of the movable stage 61 in the X-direction, the Y-direction and the Z-direction, the tilting direction of the movable stage 61 about the X-direction (the tilting (rotating) angle/pitch angle about the X-direction), the tilting direction of the movable stage 61 about the Y-direction (the tilting (rotating) angle/yaw angle about an imaginary axis in the Y-direction) and the turning (rotation) direction of the movable stage 61 about the Z-direction (the turning (rotating) angle/roll angle about the Z-direction) from detection signals input from the X-direction Hall elements HX1 and HX2, the Y-direction Hall elements HYA1 and HYA2, and HYB1 and HYB2 and the Z-direction Hall elements HZA1 and HZA2, HZB1 and HZB2, and HZC1 and HZC2.

The digital camera 10 detects the positions of the movable stage 61 (i.e., the positions of the image sensor 31) in the X-direction, the Y-direction and the Z-direction, the rotational position (tilting position) of the movable stage 61 about the X-direction, the rotational position (tilting position) of the movable stage 61 about the Y-direction, and the rotational position of the movable stage 61 about the Z-direction in a manner which will be discussed thereinafter.

The position detection circuit 43 detects the position (the amount of movement) of the movable stage 61 in the X-direction by performing arithmetic computations based on the sum signal of the detection signals input from the pair of X-direction Hall elements HX1 and HX2.

The position detection circuit 43 detects the position of the pair (left pair) of Y-direction Hall elements HYA1 and HYA2 in the Y-direction by performing arithmetic computations based on the sum signal of the detection signals input from the pair of Y-direction Hall elements HYA1 and HYA2 and detects the position of the pair (right pair) of Y-direction Hall elements HYB1 and HYB2 in the Y-direction by performing arithmetic computations using the detection signals input the pair of Y-direction Hall elements HYB1 and HYB2, e.g., based on the sum signal of the detection signals input from the pair of Y-direction Hall elements HYB1 and HYB2. Based on these two positions in the Y-direction that are spaced from each other in the X-direction, the position detection circuit 43 detects the position (the amount of movement) of the movable stage 61 in the Y-direction and the turning position (the amount of rotation) of the movable stage 61 about the Z-direction.

In addition, the position detection circuit 43 detects the positions of the movable stage 61 in the Z-direction at three different points (detects the position of the movable stage 61 in the Z-direction, the tilting position of the movable stage 61 about the X-direction and the tilting position of the movable stage 61 about the Y-direction) by performing arithmetic computations using detection signals input from the three pairs of Z-direction Hall elements HZA1 and HZA2, HZB1 and HZB2, and HZC1 and HZC2 by performing arithmetic computations, e.g., based on the quotient of the sum of a pair of detection signals and the difference of this pair of detection signals. Thereupon, based on the positions of the movable stage 61 in the Z-direction at the three different points, the position detection circuit 43 detects the position (the amount of movement) of the movable stage in the Z-direction, the tilting position (rotation position) of the movable stage 61 about an imaginary axis in the X-direction and the tilting position (rotation position) of the movable stage 61 about an imaginary axis in the Y-direction.

In the above illustrated embodiment of the stage apparatus, the position detection accuracy in the X-direction and the Y-direction does not fluctuate even when the movable stage 61 moves in the Z-direction because the pair of X-direction Hall elements HX1 and HX2 that detect the position of the movable stage 61 in the X-direction are provided at a predetermined distance therebetween in the X-direction, because the pair of Y-direction Hall elements HYA1 and HYA2 that detect the position of the movable stage 61 in the Y-direction are provided at a predetermined distance therebetween in the Y-direction, and because the pair of Y-direction Hall elements HYB1 and HYB2 that detect the position of the movable stage 61 in the Y-direction are provided at a predetermined distance therebetween in the Y-direction.

The position detection accuracy in the Z-direction does not deteriorate even when the movable stage 61 translates in the X-direction or the Y-direction or tilts about the X-direction or the Y-direction because each of the three pairs of Z-direction Hall elements HZA1 and HZA2, HZB1 and HZB2, and HZC1 and HZC2 that detect the position of the movable stage 61 in the Z-direction are provided at a predetermined distance between the pair of Hall elements in the Z-direction.

Under control of the body CPU 20, the digital camera 10 levitates the movable stage 61 in between the front fixed yoke 62 and the rear fixed yoke 63 by controlling energization of the pair of X-drive coils CX, the pair of Y-drive coils CYA and CYB and the three Z-drive coils CZA, CZB and CZC via the actuator drive circuit 42 based on the positions calculated by the position detection circuits 43.

The digital camera 10 can carry out the below-described drive control with the movable stage 61 in a levitated state based on each position calculated by the body CPU 20 (position detection circuits 43).

The movable stage 61 can be translated in the Z-direction by interaction of three equal thrust forces in the Z-direction that are generated by controlling currents through the three Z-drive coils CZA, CZB and CZC by equal amounts. Furthermore, the movable stage 61 can be tilted (rotated) about the X-direction and can be tilted (rotated) about the Y-direction by interaction of three different thrust forces in the Z-direction that are generated by individually controlling currents through the three Z-drive coils CZA, CZB and CZC.

The movable stage 61 can be translated in the X-direction by a thrust force in the X-direction that is generated by controlling a current through each X-drive coil.

The movable stage 61 can be translated in the Y-direction by interaction of two thrust forces in the Y-direction that are generated by controlling currents through the Y-drive coils CYA and CYB by equal amounts. Furthermore, the movable stage 61 can be turned (rotated) about the Z-direction by interaction of two different thrust forces in the Y-direction that are generated by individually controlling currents through the Y-drive coils CYA and CYB.

Hence, the movable stage 61 can be translated, tilted/turned, tilted/turned while being translated, translated after being tilted/turned, and tilted/turned after being translated in all six directions with six degrees of freedom (6DoF) by interaction of thrust forces in the Z-direction, thrust forces in the X-direction and thrust forces in the Y-direction which are generated by controlling currents in the Z-drive coils CZA, CZB and CZC, the X-drive coil(s) CX and the Y-drive coils CYA and CYB.

The digital camera 10 (body CPU 20) can perform a hand-shake correction (shake reduction) operation by performing a drive-control of the above-described movable stage 61 in synchronization with hand shake (shake/vibration) of the camera body 11 and the photographic lens 100 that is detected by the camera shake detecting circuit 44.

In the digital camera 10, in addition to the shake-correction operation, special photography such as swing-and-tilt photography and compositional adjustment is possible by tilting (translating, tilting (rotating), or translating and tilting) the image sensor 31, and it is also possible to carry out an automatic tilting (automatic rotation) correction operation in which the image sensor 31 is translated and tilted in order to bring wide area of an object into focus in accordance with circumstances of the object (subject). The automatic tilt correction operation of the digital camera 10 will be described hereinbelow with reference to FIGS. 6A through 14. The tilt correction operation of the illustrated embodiment includes one operation or a combination of two or more operations of the image sensor 31 of the stage apparatus 60 translating in a Z-direction, translating in a X-direction, translating in a Y-direction, tilting (rotating) about the Z-direction, tilting about the X-direction, and tilting about the Y-direction; and the image sensor 31 is tilted (rotated) relative to a plane that is orthogonal to the optical axis by the tilting about the X-direction, the tilting about the Y-direction, or a combination of both of these tilting operations about the X and Y directions. The term "translate" also refers to a linear movement without changing the attitude of the movable stage 61. The Z-direction position (optical axis (O) position), the X-direction position, the Y-direction position, the tilt position (rotational angle) about the Z-direction (optical axis O), the tilt position (rotational angle) about the X-direction (an axis in the X-direction), and the tilt position (rotational angle) about the Y-direction (an axis in the Y-direction) of the movable stage 61 are detected by the position detection circuit 43. The tilt position (rotational angle) about the Z-direction (optical axis O), the tilt position (rotational angle) about the X-direction (an axis in the X-direction), and the tilt position (rotational angle) about the Y-direction (an axis in the Y-direction) of the movable stage 61 constitute the tilt amounts (rotational amounts) and tilt correction amounts (rotational correction amounts) of the movable stage 61.

Figure 6A:
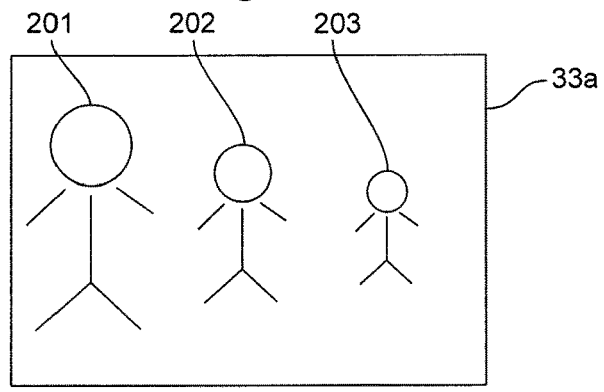
FIG. 6A shows a compositional example of photographing a plurality of people.
Figure 6B:
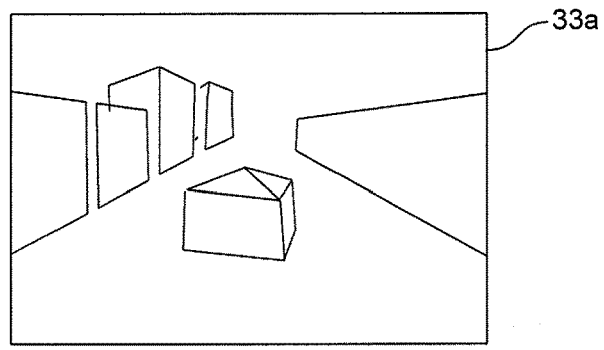
FIG. 6B shows a compositional example of a photographic street view.
Figure 6C:
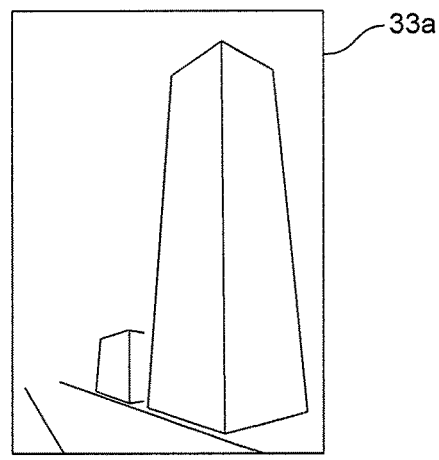
FIG. 6C shows a compositional example of photographing a building.

FIGS. 6A, 6B and 6C show examples of objects and compositional examples within a photographing frame (photographing area) 33a displayed in the image display 33. FIG. 6A shows a compositional example of three people (objects) 201, 202 and 203 positioned at horizontal positions at different object distances. FIG. 6B shows a compositional example of a photographic street view in which near objects are positioned at a lower part of the photographing frame 33a and far objects are positioned at an upper part of the photographing frame 33a. FIG. 6C shows a compositional example of vertical position photography of a building in which a near part of the object (building) is positioned at a lower part of the photographing frame 33a and a far part of the object (building) is positioned at an upper part of the photographing frame 33a. In the compositional example of FIG. 6A, if one of the three people 201 through 203 is brought into focus, the other two people become out of focus or blurred (ignoring the depth of field). In the compositions of FIGS. 6B and 6C, if a near object at a lower part of the photographing frame 33a is brought into focus, the far object(s) at the upper part of the photographing frame 33a becomes out of focus or blurred (ignoring the depth of field); and if a far object at the upper part of the photographing frame 33a is brought into focus, the near object(s) at the lower part of the photographing frame 33a becomes out of focus or blurred (ignoring the depth of field).

Figure 7:
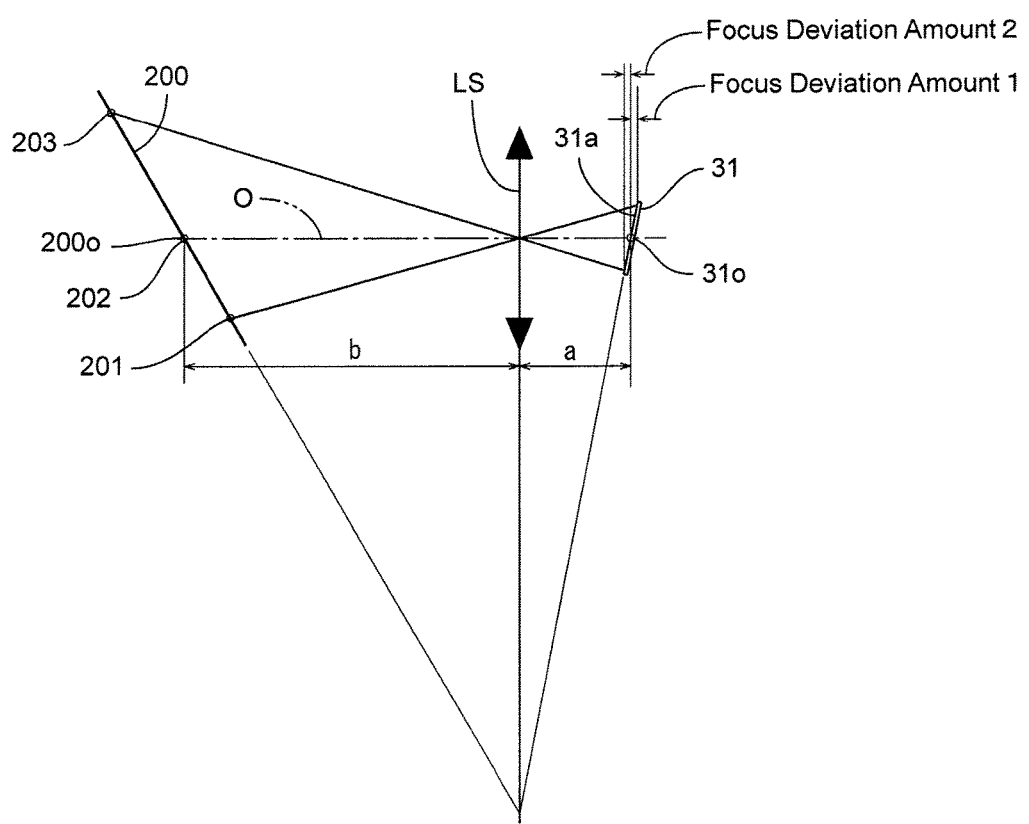
FIG. 7 is a diagram showing a relationship between an object plane (object), a principal plane of a photographing lens of the photographing apparatus, and an imaging sensor of the photographing apparatus during swing-and-tilt photography.

FIG. 7 shows a state in which the image sensor 31 has been tilted (rotated) in order to bring into focus an entire object (or object surface, parts of an object, or a plurality of objects positioned approximately on a plane) 200, which is inclined (tilted). In this example, the image sensor 31 is tilted (rotated) so that an extension of the object plane (object 200) that is inclined (tilted/rotated) relative to the optical axis O, an extension of the principal plane LS of the photographic lens 100 and an extension of the imaging surface 31a all intersect at a single point. When the image sensor 31 is tilted in such a manner, in accordance with the Scheimpflug law, all parts of the image of the object 200 that is projected on the imaging surface 31a are in an in-focus state, since the object 200 extends along the object plane; the object plane defining an in-focus plane. FIG. 7 is a simplified illustration of the relationship between the object plane (with which the object 200 coincides), a principal plane LS of the photographic lens 100, the image sensor 31 and the imaging surface 31a. Note that, strictly speaking, a principal plane includes a front principal plane and a rear principal plane, however, in the present disclosure these planes are shown as a simplified single principal plane LS. In FIG. 7, a photographing area center 200o is the center of the object 200 that is photographed (projected onto the imaging surface 31a) and aligns with an imaging surface center 31o, which is the center of the imaging surface 31a. The following imaging formulas, in an in-focus state, are attained in FIG. 7:

$1/f = 1/a + 1/b$, and $M = a/b$, wherein the focal length of the photographic lens 100 is designated as "f", the distance (the object distance) between the principal plane LS and the object 200 is designated as "b", and the distance (the image plane distance) between the principal plane LS and the imaging surface 31a (image surface center 31o) is designated as "a", wherein "M" designates the magnification (optical magnification).

The image plane distance "a" is, for example, detected from the optical-axis position of the focal adjustment lens group FL of the photographic lens 100, and the object distance "b" is detected by the image plane distance "a" and the focal length "f" of the photographic lens 100.

Accordingly, in the composition of FIG. 6A, if the three people 201 through 203 are positioned along the object plane (at locations along which the object 200 extends in FIG. 7), each of the three people 201 through 203 are brought into focus.

As shown in FIGS. 6A and 6B, when a plurality of objects within a picture frame are positioned at different distances from the digital camera 10, or as shown in FIG. 6C, when photographing an object that is inclined relative to a plane that is orthogonal to the optical axis, the digital camera 10 tilts the image sensor 31 so that the plurality of objects, or the entire object, can be brought into focus. Details of the configuration for the tilt correction operation will be described hereinbelow with reference to FIGS. 8 through 14.

Figure 8A:
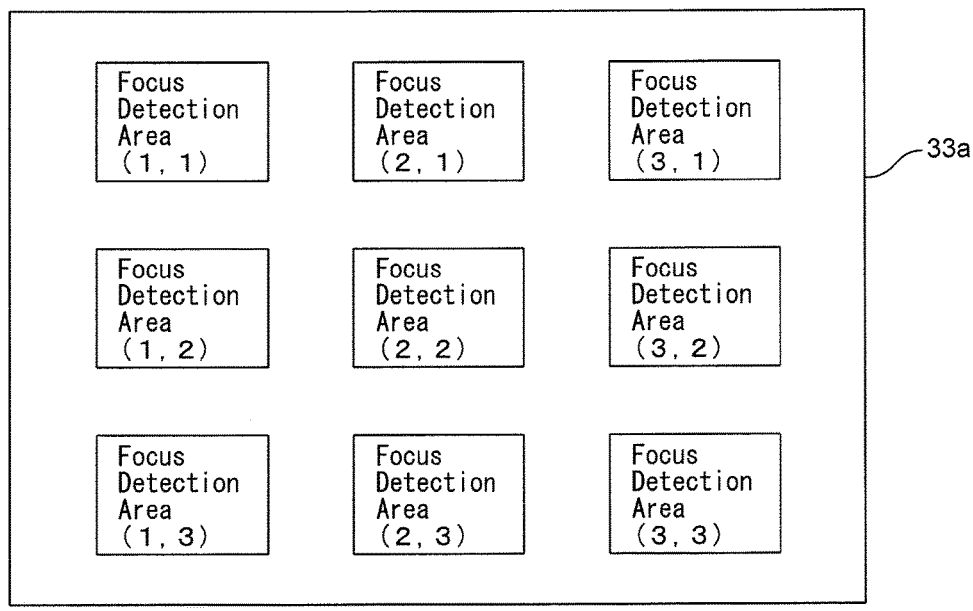
FIG. 8A is a diagram showing an example arrangement of a plurality of focus detection areas within the picture frame.
Figure 8B:
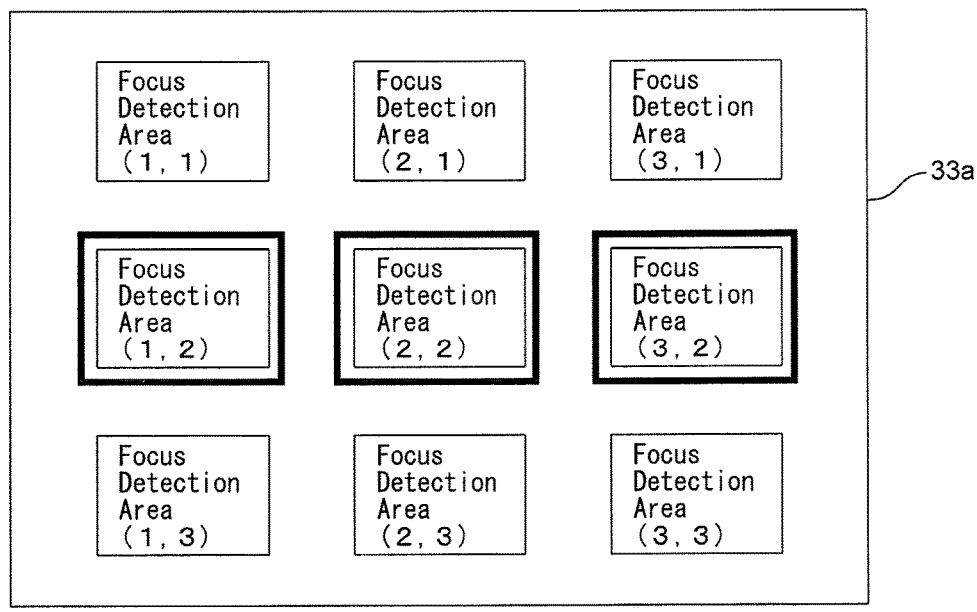
FIG. 8B is a diagram showing an example of selected focus detection areas out of the plurality of focus detection areas of FIG. 8A.

FIGS. 8A and 8B show an embodiment of nine focus detection areas (1, 1) through (3, 3) on the photographing frame 33a (image sensor 31) which can perform focus detection on corresponding objects (object images) or object portions. In the illustrated embodiment, three focus detection areas (1, 1), (1, 2) and (1, 3), the three focus detection areas (2, 1), (2, 2) and (2, 3), and the three focus detection areas (3, 1), (3, 2) and (3, 3) that are respectively arranged in the short direction (vertical direction/gravity direction when photographing at the erect position) of the landscape-oriented rectangular photographing frame 33a are arranged as a 3×3 matrix. The three focus detection areas (1, 1), (2, 2) and (3, 3), and the three focus detection areas (3, 1), (2, 2) and (1, 3), are arranged diagonally with respect to both the long direction (horizontal direction/longitudinal direction/a direction orthogonal to the gravity direction when photographing at the erect position) and the short direction of the landscape-oriented rectangular photographing frame 33a.

Figure 9A:
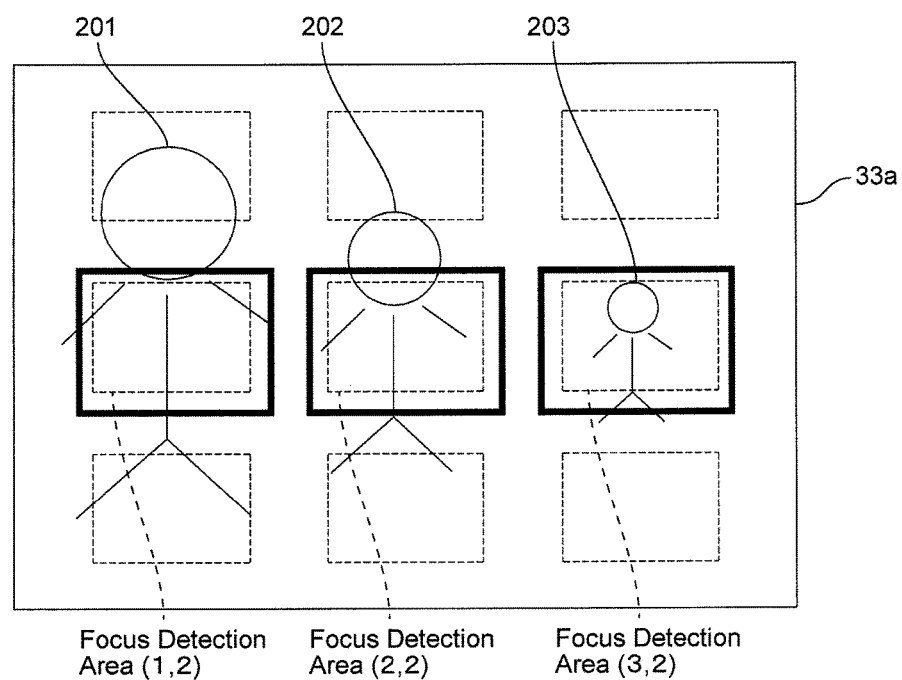
FIG. 9A is a diagram showing the composition shown in FIG. 6A overlapped with the selected focus detection areas of FIG. 8B, out of the plurality of focus detection areas of FIG. 8A.

FIG. 8B shows three focus detection areas (1, 2), (2, 2) and (3, 2), which are aligned in the longitudinal direction at a central position, with respect to the short direction, of the photographing frame 33a, that are selected out of the focus detection areas (1, 1) through (3, 3) of FIG. 8A. In the photographing frame 33a, each of the selected focus detection areas (1, 2), (2, 2) and (3, 2) (selection focus detection areas) is shown as having a bold frame therearound, in order to be distinguished from the focus detection areas (1, 1), (2, 1), (3, 1), (1, 3), (2, 3) and (3, 3) that are not selected. Note that various other methods can be applied to visually distinguish the selected focus detection areas other than displaying a bold frame, such as deepening the color, adding color, changing the color, or graying out (lightening the display) the areas that have not been selected, etc. FIG. 9A shows the photographic composition of FIG. 6A overlapped with the photographing frame 33a of FIG. 8B. The three people 201 through 203 overlap with the focus detection areas (1, 2), (2, 2) and (3, 2), and the focus deviation amounts (defocus amounts) at the focus detection areas (people 201 through 203) can be respectively detected.

Figure 9B:
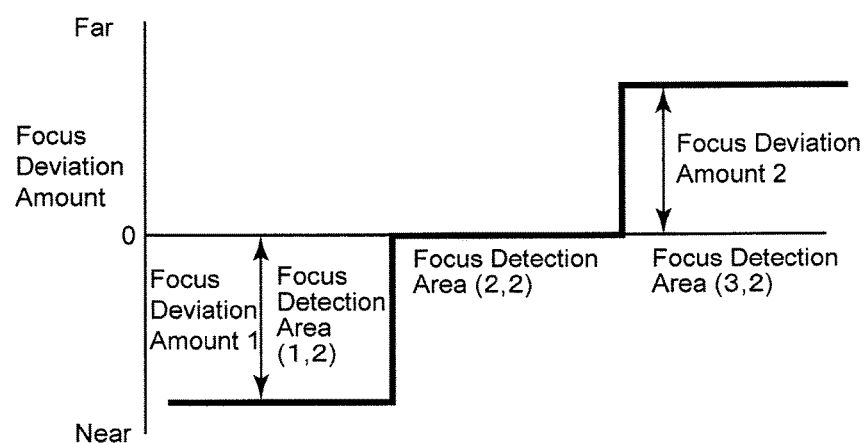
FIG. 9B is an explanatory graph of focus deviation amounts of the selected focus detection areas shown in FIG. 9A.

In this embodiment, in the initial state, the central focus detection area (2, 2) has been brought into focus. FIG. 9B shows a graph of the focus deviation amounts of the three focus detection areas (1, 2), (2, 2) and (3, 2) arranged in the longitudinal direction (horizontally). In FIG. 9B, the vertical axis designates the focus deviation amount and the horizontal axis designates the focus detection area. As clearly shown in this graph, since the central focus detection area (2, 2) (corresponding to the person 202 at the center) is in-focus, the focus deviation amount is 0; since the left focus detection area (1, 2) (corresponding to the person 201 at the left side) is in a back-focus state, the focus deviation amount is 1; and since the right focus detection area (3, 2) (corresponding to the person 203 at the right side) is in a front-focus state, the focus deviation amount is 2.

Consequently, in order to achieve an in-focus state at all of the selected three focus detection areas (1, 2), (2, 2) and (3, 2), the image sensor 31 is tilted (rotated). Hence, the image sensor 31 is tilted about an axis in the Y-direction (short direction) that passes through the image surface center 31o so that the area of the imaging surface 31a onto which the left person 201 at a close distance is projected moves away from the principal plane LS by the focus deviation amount 1, and the area of the imaging surface 31a onto which the right person 203 at a far distance is projected moves closer to the principal plane LS by the focus deviation amount 2 (see FIG. 7). Hence, by tilting the image sensor 31, the person 201 at a close distance and the person 203 at a far distance can be brought into focus in addition to the person 202 at the center. Note that since the image sensor 31 is tilted about the image surface center 31o, the distance "a" from the principal plane LS to the image surface center 31o does not change, and hence, the person 202 at the center remains at an in-focus state.

Since the digital camera 10 detects the focus deviation amounts of the three focus detection areas (1, 2), (2, 2) and (3, 2) and carries out a tilt adjustment operation on the image sensor 31 so that each focus deviation amount is 0, i.e., to be brought into focus, the three people 201 through 203 who are at different object distances can all be simultaneously be brought into focus.

Figure 10A:
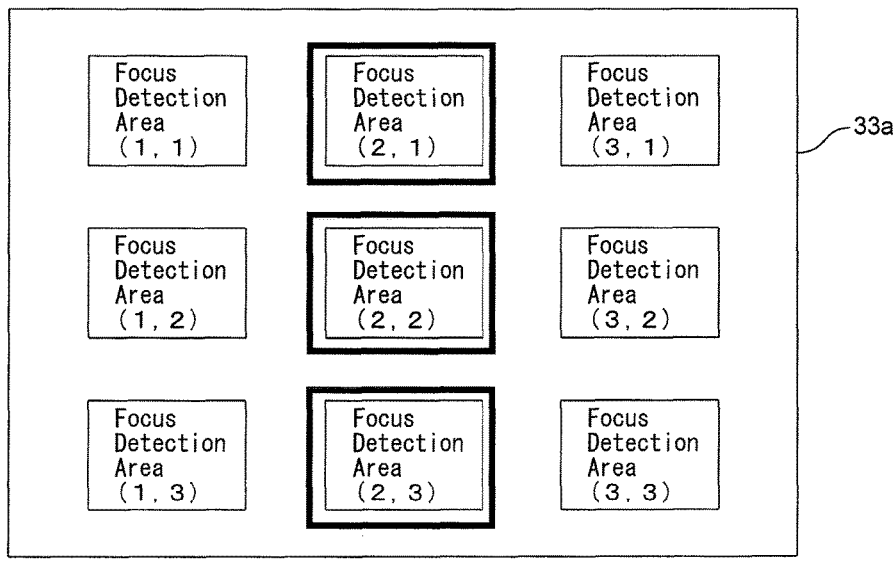
FIG. 10A is a diagram showing an example of focus detection areas that are selected in a vertical direction out of the plurality of focus detection areas of FIG. 8A.
Figure 10B:
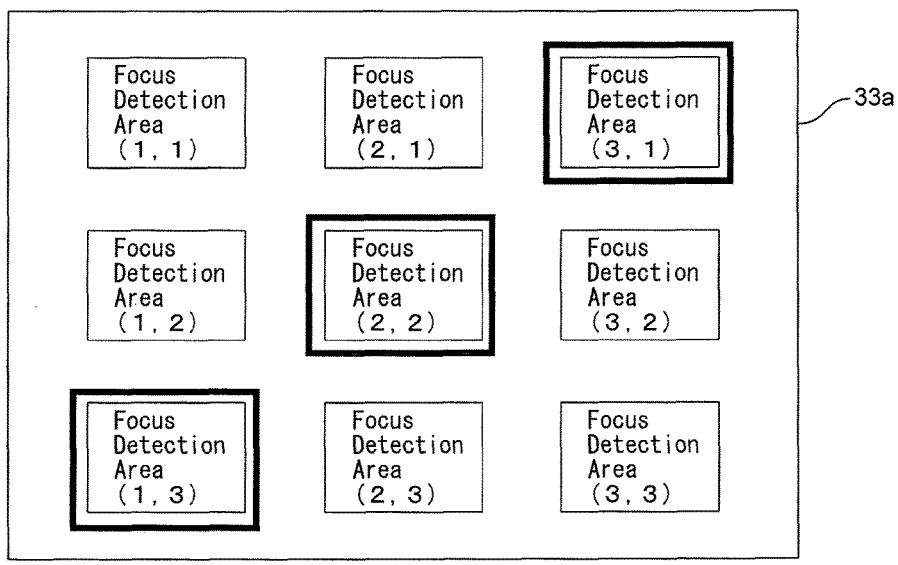
FIG. 10B is a diagram showing an example of focus detection areas that are selected in a diagonal direction out of the plurality of focus detection areas of FIG. 8A.

FIG. 10A shows an example in which three focus detection areas (2, 1), (2, 2) and (2, 3), which are aligned vertically in the short direction at the center of the photographing frame 33a, are selected and the image sensor 31 is tilted (rotated) about an axis in the Y-direction (longitudinal direction). FIG. 10B shows an example in which three focus detection areas (3, 1), (2, 2) and (1, 3) arranged in a diagonal direction are selected and the image sensor 31 is tilted (rotated) about an axis that is orthogonal to an axis that passes through the three focus detection areas (3, 1), (2, 2) and (1, 3); namely, the image sensor 31 is tilted (rotated) about an axis that extends orthogonally to the arrangement direction of the selected focus detection areas. The above-described focus detection area selection arrangements are just some examples; the digital camera 10 can select other focus detection areas in the vertical direction, horizontal direction or diagonal direction. If the object distances change in a constant direction, the focus detection areas in such a constant direction only need to be able to be selected.

The number and arrangement of the focus detection areas (1, 1) through (3, 3) are not limited to the those of the illustrated embodiment.

Figure 11:
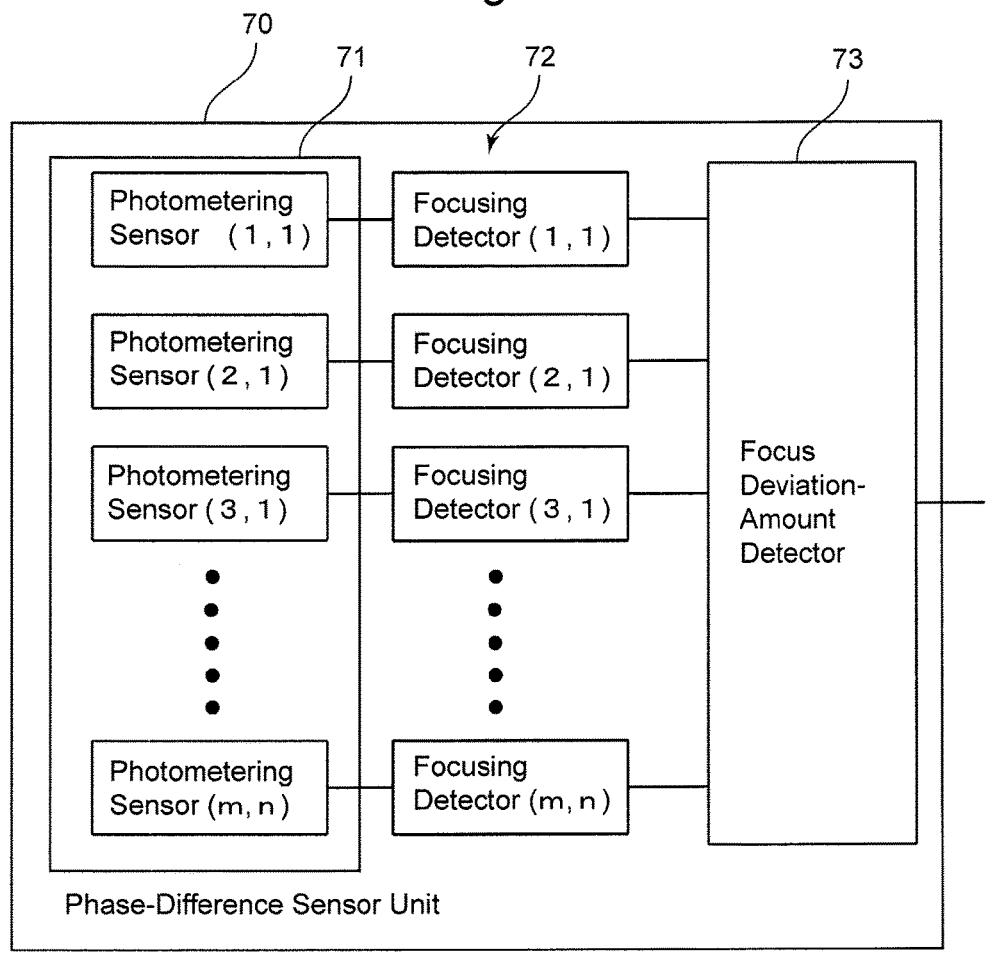
FIG. 11 is a block diagram of a configuration example of a phase-shift detection circuit in the case where the autofocusing adjusting device, of the photograph apparatus, uses a phase-difference detection method.

An embodiment of an automatic tilt correction operation that is performed by the digital camera 10 will be hereinbelow described with reference to FIGS. 11 through 14. FIG. 11 is a block diagram of a configuration example of a phase-shift detection circuit (a focus detector, a focus deviation-amount detector) 70 in the case where the autofocusing adjusting device, of the digital camera 10, uses a phase-difference detection method.

The phase-shift detection circuit 70 is provided with a phase-difference sensor unit (a focus detector) 71 which can detect focus deviation amounts (defocus amounts) of the object(s) at the plurality of focus detection areas (1, 1) through (m, n) within the photographing frame 33a. The phase-difference sensor unit 71 is provided with photometering sensors (1, 1) through (m, n) which correspond to the focus detection areas (1, 1) through (m, n). Each of the photometering sensors (1, 1) through (m, n) is provided with a pair of sensor arrays which respectively receive a pair of pupil-divided object-emanating light bundles, and outputs a pair of image signals. Note that "m" and "n" are integers greater than 1, and may have the same or different value; in the embodiment shown in FIG. 8, the maximum values "m" and "n" are: m=n=3.

Each of the photometering sensors (1, 1) through (m, n) outputs a pair of image signals to a focusing detector (a focus deviation-amount detector) 72 provided in the phase-shift detection circuit 70. The focusing detector 72 is provided with focusing detectors (1, 1) through (m, n) corresponding to photometer sensors (1, 1) through (m, n), and each of the focusing detectors (1, 1) through (m, n) detects a phase-difference between the corresponding pair of image signals, and outputs the result (phase-difference) to a focus deviation-amount detector 73 provided in the phase-shift detection circuit 70. The focus deviation-amount detector 73 calculates a focus deviation amount for each focusing detector (1, 1) through (m, n), and outputs the calculated results to the body CPU 20.

The body CPU 20 carries out an autofocusing adjusting operation, in which the focal adjustment lens group FL of the photographic lens 100 is driven (moved forwardly and rearwardly) in the optical axis direction by the AF Unit 22 so that the focus deviation amount of one focus detection area of the selected focus detection areas (selected from the plurality of focus detection areas (1, 1) through (m, n)) becomes 0 (becomes in focus), and carries out a tilt correction operation, in which the image sensor 31 is tilted (rotated) so that the focus deviation amounts of all of the selected focus detection areas becomes 0 or (the absolute value thereof) becomes a minimum value. In an embodiment, the autofocusing adjusting operation is performed based on the focus deviation amount of the focus detection area that is closest to the center of the photographing frame 33a out of the selected focus detection areas, or, e.g., is performed based on an intermediate (midway) value out of a plurality of focus deviation amounts; thereafter, a tilt correction operation is carried out so that the focus deviation amounts of the other remaining selected focus detection areas become 0.

Details of an automatic tilt (rotation) correction operation that is performed by the digital camera 10 will be described hereinbelow with reference to the flowchart of FIG. 12. Note that the descriptions are based on the photographing frame 33a having nine focus detection areas (1, 1) through (3, 3) shown in FIGS. 8A and 8B, and the focusing detector 72 having focusing detectors (1, 1) through (3, 3). In the digital camera 10, upon the power being switched ON, the body CPU 20 drives the stage apparatus 60 via the anti-shake/tilt control circuit 41 and the actuator drive circuit 42, to hold the image sensor 31 of the movable stage 61 at an initial position, at which an imaging surface 31a is orthogonal to the optical axis, the optical axis O passes through the center of the imaging surface 31a, and the position of the imaging surface 31a with respect to the direction of the optical axis (O) is aligned with the design optical axis position. The digital camera 10, in an initial state in which the image sensor 31 is held at the initial position, carries out photographing preparation operations such as carrying out a focal adjustment before a photographing operation and a photometering operation, etc., carries out a shake-correction operation, and a monitor image that is captured by the image sensor 31 is displayed on the image display 33. In the illustrated embodiment of the digital camera 10, the automatic tilt correction operation will be described as starting from the initial state after the above-mentioned focal adjustment operation is carried out.

The digital camera 10 decides the focus detection areas, namely, decides (selected/designates) which focus detection areas out of the focus detection areas (1, 1) through (3, 3) to use for a tilt correction operation (S11).

An initial tilt amount (rotational amount) is stored in a RAM 20a (S13). Although the initial tilt amount is 0 at the initial state, if the image sensor 31 is already tilted, the tilting amount thereof is input via the position detection circuit 43 and is stored in the RAM 20a.

The body CPU 20 calculates the magnification M from the focal length f, the object distance "b" and the image distance "a", and stores the magnification M in the RAM 20a (S15).

Thereafter, the focus deviation amounts of the selected focus detection areas are detected (S17), and the difference between each focus deviation amount thereof is calculated (S19).

Thereafter, a tilt correction amount is calculated in order to minimize the focus deviation amounts at the selected focus detection areas (S21). For example, in FIGS. 9A and 9B, the body CPU 20 calculates a tilt correction amount of the image sensor 31 so that the focus deviation amounts of the selected focus detection areas (1, 2), (2, 2) and (3, 2) each become a minimum value.

Based on the calculated tilt correction amount, a tilt correction operation is carried out on the image sensor 31 via the stage apparatus 60 (S23).

Upon the tilt correction operation being carried out, the focus deviation amounts of the selected focus detection areas are detected, and if focus deviation amounts still occur, the image sensor 31 is finely adjusted (is linearly driven (translated) forwardly or rearwardly) in the optical axis direction via the stage apparatus 60 to perform a focusing correction (focal adjustment) operation (S25), and thereafter the automatic tilt correction operation ends (S27).

According to the above-described tilt correction operation, when the digital camera 10 detects different focus deviation amounts within the designated or selected focus detection areas (designated or selected from within the focus detection areas (1, 1) through (3, 3)), since a tilt correction operation is carried out on the image sensor 31 so that all of the focus deviation amounts become 0, i.e., so that the object (or object surface, parts of an object, or a plurality of objects positioned approximately on a plane) at each selected focus detection area of the imaging surface 31a is brought into focus, the entire object (entire object area, etc.) can be brought into focus. Accordingly, the photographer (user) does not need to carry out a manual tilt correction operation, thereby enabling the photographer to easily carry out a special photographing operation such as swing-and-tilt photography.

The digital camera 10 performs a still photographing operation upon the automatic tilt correction operation ending (S27), thereby obtaining a high-quality image in which the entire object(s) is brought into focus.

Figure 12:
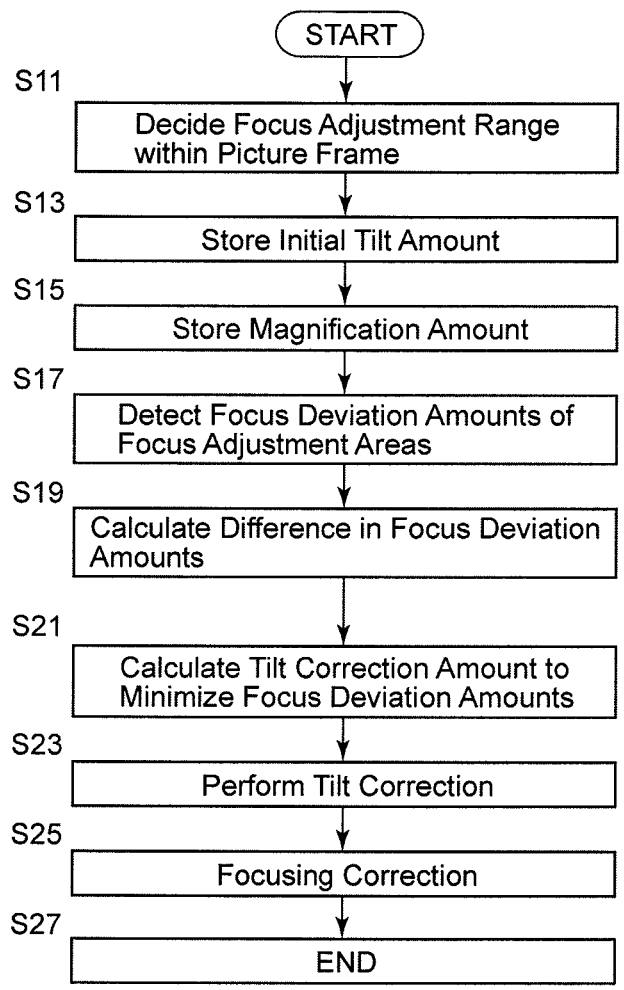
FIG. 12 is a flowchart of an example tilt adjustment operation of the photographing apparatus.

In the embodiment shown in FIG. 12, in the case where the focus deviation amount detected in step S25 is greater than the translatable amount of the image sensor 31 in the optical axis (O) direction via the stage apparatus 60, the focal adjustment lens group FL may be driven to perform a focus correction operation.

Step S25 may be omitted, thereby reducing the risk of missing out on a photographic opportunity in the case where a shutter-priority mode is in operation.

Figure 13:
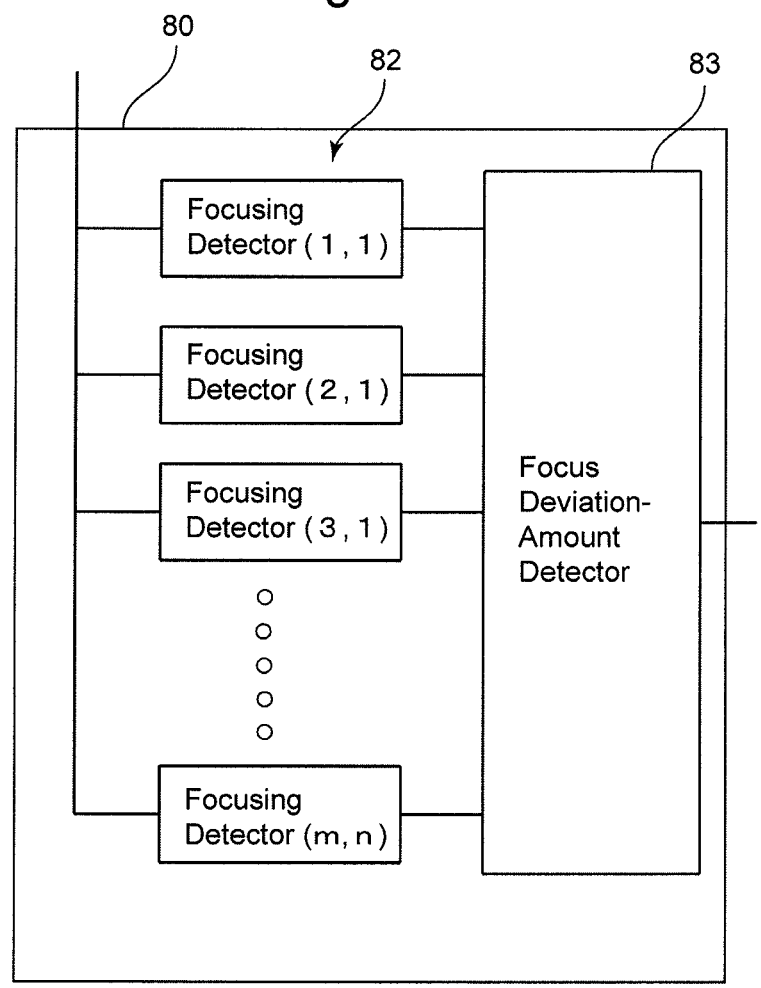
FIG. 13 is a block diagram of a configuration example of an image-contrast detection circuit in the case where the autofocusing adjusting device, of the photograph apparatus, uses a contrast detection method.

FIG. 13 is a block diagram of a configuration example of a contrast detection circuit 80 in the case where the autofocusing adjusting device, of the digital camera 10, uses a contrast detection method. The contrast detection circuit is provided with a focus detector 82 and a focus deviation-amount detector 83. The focusing detector 82 is provided with a plurality of focusing detectors (1, 1) through (m, n) corresponding to focus detection areas (1, 1) through (m, n). The image sensor 31 captures an image, and the image processor 32 performs a predetermined image-processing operation on the image signals that are output from the image sensor 31, and the resultant image signals is output to the contrast detection circuit 80. The contrast detection circuit 80 detects a contrast based on image signals at image areas, at which focus detectors (1, 1) through (m, n) correspond to focus detection areas (1, 1) through (m, n), and outputs the result to the focus deviation-amount detector 83. The focus deviation-amount detector 83 links (correlates) positions of the focal adjustment lens group FL with each of the focus detection areas (1, 1) through (m, n), and stores contrast values in a memory.

The above-described contrast detection and storing of contrast values are repeatedly carried out while moving the focal adjustment lens group FL, via the AF Unit 22, in a direction from a position at the minimum photographing distance to a position at the infinite photographing distance, or vice versa in the opposite direction thereto. Hence, at each focus detection area (1, 1) through (m, n), the focus deviation-amount detector 83 detects the position of the focal adjustment lens group FL at which a contrast peak of obtained as an in-focus position. Thereupon, each difference between a reference in-focus position (e.g., the in-focus position at the center focus detection area) and the other in-focus positions are calculated, and the respective calculated results are set as focus deviation amounts.

Figure 14:
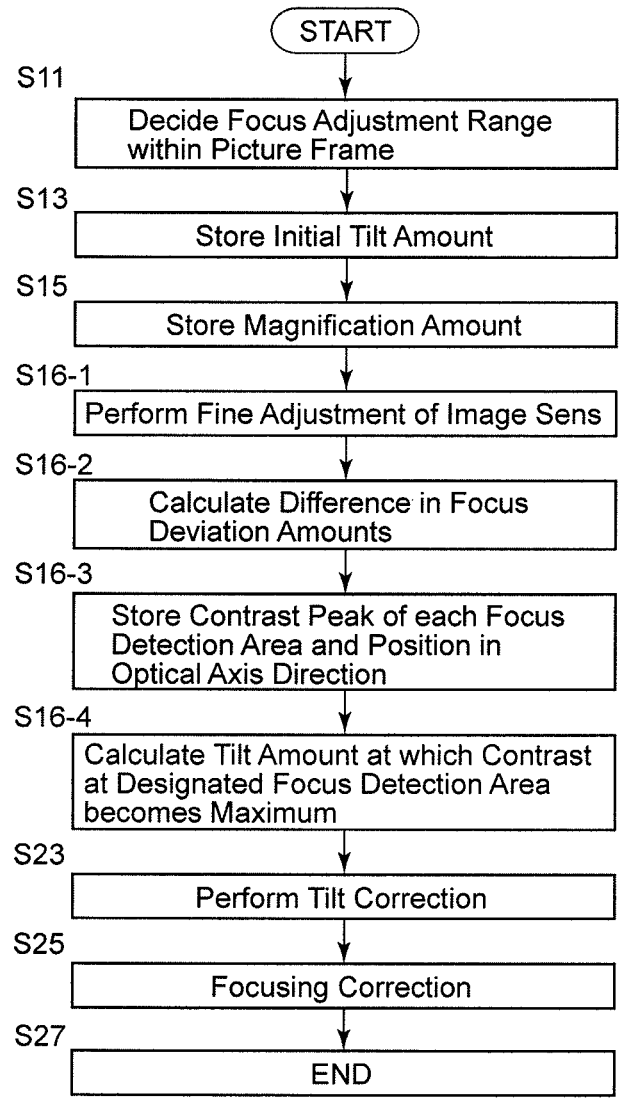
FIG. 14 is a flowchart of an example tilt adjustment operation of the photographing apparatus.

FIG. 14 shows a flowchart of an embodiment of an automatic tilt (rotation) correction operation in the case where the digital camera 10 is provided with a contrast detection autofocusing adjusting device. Operations that are the same as the automatic tilt correction shown in FIG. 12 have been designated with the same step numbers, and a detailed explanation thereof has been omitted. Note that in this embodiment, the descriptions are based on the photographing frame 33a having nine focus detection areas (1, 1) through (3, 3) shown in FIGS. 8A and 8B, and the focusing detector 82 having focusing detectors (1, 1) through (3, 3).

Similar to the embodiment shown in FIG. 12, the digital camera 10 decides the focus detection areas, namely, decides (selected/designates) which out of the focus detection areas (1, 1) through (3, 3) to use for an automatic tilt correction operation (S11), stores an initial tilt amount (rotational amount) in the RAM 20a (S13), and calculates and stores a magnification M in the RAM 20a (S15).

Thereafter, the image sensor 31 is finely adjusted (translated) in the optical axis (O) direction (S16-1), and the contrasts of the selected focus detection areas are detected by the contrast detection circuit 80 (S16-2). At this step (S16-2), the operation of finely adjusting the image sensor 31 in the optical axis (O) direction, via the stage apparatus 60, and detecting the contrasts of the selected focus detection areas is carried out by repeatedly finely adjusting (moving) the image sensor 31 forwardly or rearwardly in the optical axis direction via the stage apparatus 60 to obtain contrast peaks, and the position in the optical axis direction of the image sensor 31 is detected when each contrast peak is obtained. Thereafter, each difference of the optical axis position of the image sensor 31, at which each contrast peak was attained at the selected focus detection areas, is calculated.

The contrast peaks obtained in the selected focus detection areas and the optical-axis positions of the image sensor 31 at which the contrast peak were obtained are stored in the RAM 20a (S16-3).

Thereafter, a tilt amount at which the contrast at a designated focus detection area is maximum (at which the focus deviation amount is 0, or as close to 0 as possible) is calculated (S16-4).

Subsequently, a tilt correction operation is carried out on the image sensor 31 via the stage apparatus 60 based on the calculated tilt correction amount (S23).

Upon the tilt correction operation being carried out, the focus deviation amounts of the selected focus detection areas are detected, and if focus deviation amounts still occur, the image sensor 31 is finely adjusted (is linearly driven forwardly or rearwardly) in the optical axis direction via the stage apparatus 60 to perform a focusing correction (focal adjustment) operation (S25), and thereafter the automatic tilt correction operation ends (S27). In the case where the focus deviation amount detected in step S25 is greater than the translatable amount of the image sensor 31 in the optical axis (O) direction via the stage apparatus 60, the focal adjustment lens group FL may be driven to perform a focus correction operation.

Accordingly, the digital camera 10 can bring into focus the entire object (or the entire object area) that is within the selected or designated focus detection areas via the above-described automatic tilt correction operation.

In the automatic tilt correction operation, the focus detection areas to be brought into focus can be configured to be selected or designated in groups from predetermined groups of focus detection areas, or the user may separately designate the focus detection areas to be brought into focus. The focus detection areas can be, for example, grouped as a plurality of focus detection areas in the horizontal direction, the vertical direction, or in a diagonal direction, and priority modes are set which prioritize the groups of focus detection areas. The priority modes include a horizontal-direction priority mode, a vertical-direction priority mode, and a diagonal-direction priority mode.

Furthermore, there also can be a collective priority mode (which results in all of the focus deviation amounts becoming minimum amounts) in which a tilt correction operation is carried out so that the absolute values of the focus deviation amounts in all or a plurality of focus detection areas become minimum (so that a total or an average absolute value becomes a minimum value).

The horizontal-direction priority mode is a tilt-correction operation mode which detects inclination (perspective difference) of an object (or object surface, parts of an object, or a plurality of objects positioned approximately on a plane) in a horizontal direction by detecting the focus deviation amounts of the object at each of the selected focus detection areas (FIG. 8B) which are arranged in the horizontal direction, which is parallel to the longitudinal direction of the photographing frame 33a (imaging surface 31a), and tilts (rotates) the image sensor 31 about a vertical direction that is orthogonal to the horizontal direction, via the stage apparatus 60, based on the detected results.

The vertical-direction priority mode is a tilt-correction operation mode which detects inclination (perspective difference) of an object (or object surface, parts of an object, or a plurality of objects positioned approximately on a plane) in a vertical direction by detecting the focus deviation amounts of the object at each of the selected focus detection areas (FIG. 10A) which are arranged in the vertical direction, which is parallel to the short direction of the photographing frame 33a (imaging surface 31a), and tilts (rotates) the image sensor 31 about a horizontal direction that is orthogonal to the vertical direction, via the stage apparatus 60, based on the detected results.

The diagonal-direction priority mode is a tilt-correction operation mode which detects inclination (perspective difference) of an object (or object surface, parts of an object, or a plurality of objects positioned approximately on a plane) in a diagonal direction by detecting the focus deviation amounts of the object at each of the selected focus detection areas (FIG. 10B) which are arranged in a diagonal direction (downwards toward the right or downwards toward the left), which is inclined to both the longitudinal direction and the short direction of the photographing frame 33a (imaging surface 31a), and tilts (rotates) the image sensor 31 about a direction that is orthogonal to the diagonal direction, via the stage apparatus 60, based on the detected results. The diagonal-direction tilt correction operation can be achieved by a combination of tilting (rotating) about the vertical direction and tilting (rotating) about the horizontal direction.

The collective priority mode is a tilt-correction operation mode which detects the focus deviation amounts within all or a plurality of focus detection areas, and tilts (rotates) the image sensor 31 about the horizontal direction and about the vertical direction, and translates the image sensor 31 in the optical axis direction, via the stage apparatus 60, so that the total or average value of the focal deviation amounts (absolute values) become a minimum value.

The above-described collective priority mode can be selected by a configuration in which the tilt setting circuit 46 sets the collective priority mode upon receiving a command from a tilt operation switch(es), provided on the digital camera 10.

In an alternative configuration for selecting focus detection areas, the photographer (user) commands or selects a plurality of focus detection areas or a plurality of locations on an object that the photographer wishes to bring into focus (for use in the tilt correction operation). Furthermore, a configuration is possible in which focus detection areas displayed on the image display 33 can be selected by tilt operation switches (manual selector) 45, and in the case where the image display 33 is a touch panel (touch screen), a configuration is possible in which commands (touch/contact operations) are performed by touching, tapping or sliding, etc., the user's finger on the image display 33. In the case where a touch panel display is used as the image display 33, a priority portion(s) (focus detection area(s)) of the object (subject) to be photographed that have priority over other portions of the object for being brought into focus can be selected by the user using his/her finger to trace such a priority portion(s).

Furthermore, in an alternative configuration for selecting focus detection areas, the photographer (user) swings the digital camera 10 in a direction in which the photographer wants to prioritize the tilting (of the image sensor 31). For example, the digital camera 10 can be configured so that if the digital camera 10, starting at an initial erect position, is swung in a horizontal direction, the horizontal-direction priority mode is selected (which prioritizes the focus detection areas that are arranged in the horizontal direction), or if the digital camera 10 is swung in a vertical direction, the vertical-direction priority mode is selected (which prioritizes the focus detection areas that are arranged in the vertical direction). The swinging direction of the digital camera 10 can be detected by utilizing detection results of the X-direction acceleration detector GSX, the Y-direction acceleration detector GSY and the Z-direction acceleration detector GSZ.

In the case where the digital camera 10 is a single-lens reflex (SLR) digital camera provided with an optical finder, in which the focus detection areas are displayed within the field-of-view of the optical finder, the photographer (user) may decide on the photographic composition with respect to the object that the photographer wants to photograph while viewing the object through the optical finder, and determine a plurality of focusing locations (out of the displayed focus detection areas) by operating switch (es), etc. During such an operation, the focusing locations are stored in memory via image positions and coordinates. Thereafter, a tilt correction operation of the image sensor 31 and an autofocusing adjusting operation are carried out so that the focal points at the determined focusing locations are optimum at the moment a shutter-release operation is performed. Furthermore, a view-point (line-of-vision) detector can be provided on the optical finder, whereby an object area (focus detection area) that aligns with the line-of-vision of the photographer (user) can be selected, a focus detection area (s) in a movement direction of the photographer's line-of-vision can be selected, or the priority mode corresponding to the direction of the photographer's line-of-vision can be selected. Furthermore, the optical finder may be an electronic view finder, in which a display that displays an object image that is captured by the image sensor (31) can be viewed via an eyepiece.

Although the stage apparatus 60 of the illustrated embodiment includes a moving coil configuration in which permanent magnets are fixed to front and rear yokes, and drive coils and hall sensors are fixed to the movable stage (61), however, the stage apparatus 60 may alternatively include a moving magnet configuration in which permanent magnets are fixed to the movable stage (61), and drive coils and hall sensors are fixed to front and rear yokes. If such a moving magnet configuration is applied, the number of flexible printed circuit boards drawn from the movable stage (61) can be reduced, the load on the movable stage (61) can be reduced, and the movable stage (61) can be more rapidly and accurately driven.

The stage apparatus according to the present invention can be applied to various photographing apparatuses and optical apparatuses such as an interchangeable lens and a camera-integrated lens, in addition to a so-called mirrorless digital camera, an SLR (single lens reflex) digital camera, a compact digital camera, a digital video camera, drive recorder, action camera, a digital camera installed in a portable terminal (mobile phone, smartphone), etc.

Furthermore, the present invention can also be applied to a projector (image projector apparatus) which projects images (still/moving images) and data, etc., or a laser scanner. In the case where the present invention is applied to a projector, the projector can be provided at an approximate center of the movable stage 61 with an image-forming element (LCD panel) which allows projection light to be incident thereon from one side (the rear) of the LCD panel in the thickness direction of the movable stage 61 (the first direction/the Z-direction) and to emerge from the LCD panel to travel toward an projector optical system provided on the other side (the front) of the movable stage, or the projector can be provided at an approximate center of the movable stage 61 with a DMD (digital mirror device/digital micro mirror device) panel (projection panel) which reflects the incident projection light, which is incident thereon from a direction different from the first direction (the Z-direction), in the first direction (toward the projector optical system). Alternatively, a projector optical system can be mounted on the movable stage 61 instead of the image-forming element.

Figure 15:
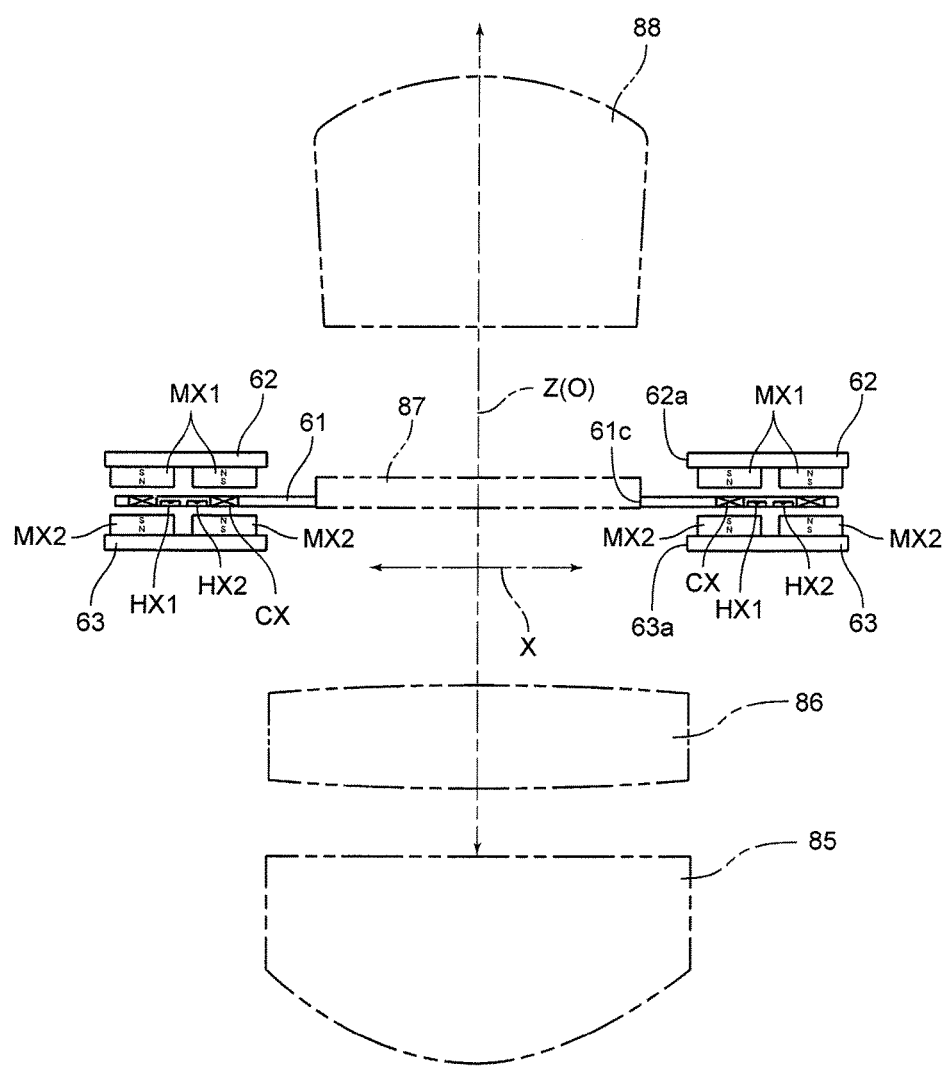
FIG. 15 is a cross-sectional view, corresponding to FIG. 2B, showing an embodiment of an image projector apparatus, according to the present invention.

FIG. 15 shows an embodiment of an image projector apparatus (projector) equipped with the stage apparatus 60 provided with the movable stage 61. The image projector apparatus is provided with a light source 85, an illumination optical system 86 which enables a uniform distribution of light emitted from the light source 85, an image-forming element 87 which forms an image upon receiving illumination light which emerges from the illumination optical system 86, the movable stage 61 on which the image-forming element 87 is mounted in an opening 61c, and a projector optical system 88, which projects the image formed by the image-forming element 87. Specific examples of the image-forming element 87 are an LCD panel or a DMD panel. The image-forming element 87 is installed onto a housing of the projector or the projector optical system 88 via the movable stage 61. The image-forming element 87 is positioned inside the projector so that a plane on which the image formed by the image-forming element 87 is formed is orthogonal to the optical axis O of the projector optical system 88 or the optical axis of any one of the lens elements of the projector optical system 88 in a state where the movable stage 61 is not driven (when the movable stage 61 is held at the initial position). The projecting direction and the projection position can be adjusted by changing the direction of the projection light which travels toward the projector optical system 88 after passing through the LCD panel or changing the direction of the projection light which is reflected by the DMD panel to travel toward the projector optical system 88, or adjusting the orientation of the projection image by translating the movable stage 61 in the Z-direction (optical axis O direction/first direction), X-direction (second direction) and/or the Y-direction (third direction) and/or rotating (turning) the movable stage 61 about the Z-direction (first direction) and/or rotating (tilting) the movable stage 61 about the X-direction (second direction) and/or the Y-direction (third direction), and the focus state can be adjusted by adjusting the distance between the projector optical system 88 and the LCD panel or the DMD panel.

Note that the projector may be provided with a focal detector for detecting a focal shift amount and/or a, e.g., a trapezoidal distortion detector for detecting trapezoidal distortion in the projected image; these detectors are used when focusing and when correcting trapezoidal distortion. In regard to trapezoidal distortion in particular, by providing a trapezoidal distortion detector, a trapezoidal distortion amount can be detected and automatically corrected by tilting the projected image with an image tilter based on a focal shift amount.

Furthermore, the projector of the present embodiment can also be applied to digital signage technology. Specifically, the projector of the present embodiment can be utilized for shake correction in the case where the projector is installed in transportation such as inside a train or an automobile. Alternatively, the projector of the present embodiment can be utilized for shake correction in the case where the projector is installed in a movable robot. Furthermore, by installing the shake-correction device of the present invention in a hand-held miniature projector, hand-shake can be effectively corrected. It should be noted that the projector of the present embodiment can be generally installed in a photographing apparatus. In the case where a miniature projector is installed onto a photographing apparatus body, or a display thereof, photographing shake-correction may be carried out, during a photographing operation, by translating and/or rotating (tilting/turning) a movable stage that holds an image sensor or an optical element (lens group, etc.) of a photographing optical system; and a shake-correction may be carried out, during a projecting operation of a photographing image, by translating and/or rotating (tilting/turning) a movable stage that holds an image-forming element so that the projected image does not shake. In the case where the shake-correction device of the present invention is installed a projector, although it is possible to achieve a higher resolution by a pixel shifting method in which the number of pixels that are displayed are increased by shifting the image-forming element by a half pixel or by one pixel, it is also possible to achieve a higher resolution by rotating the movable stage on which the image-forming element is mounted instead of, or in addition to, performing a pixel shifting method.

Figure 16:
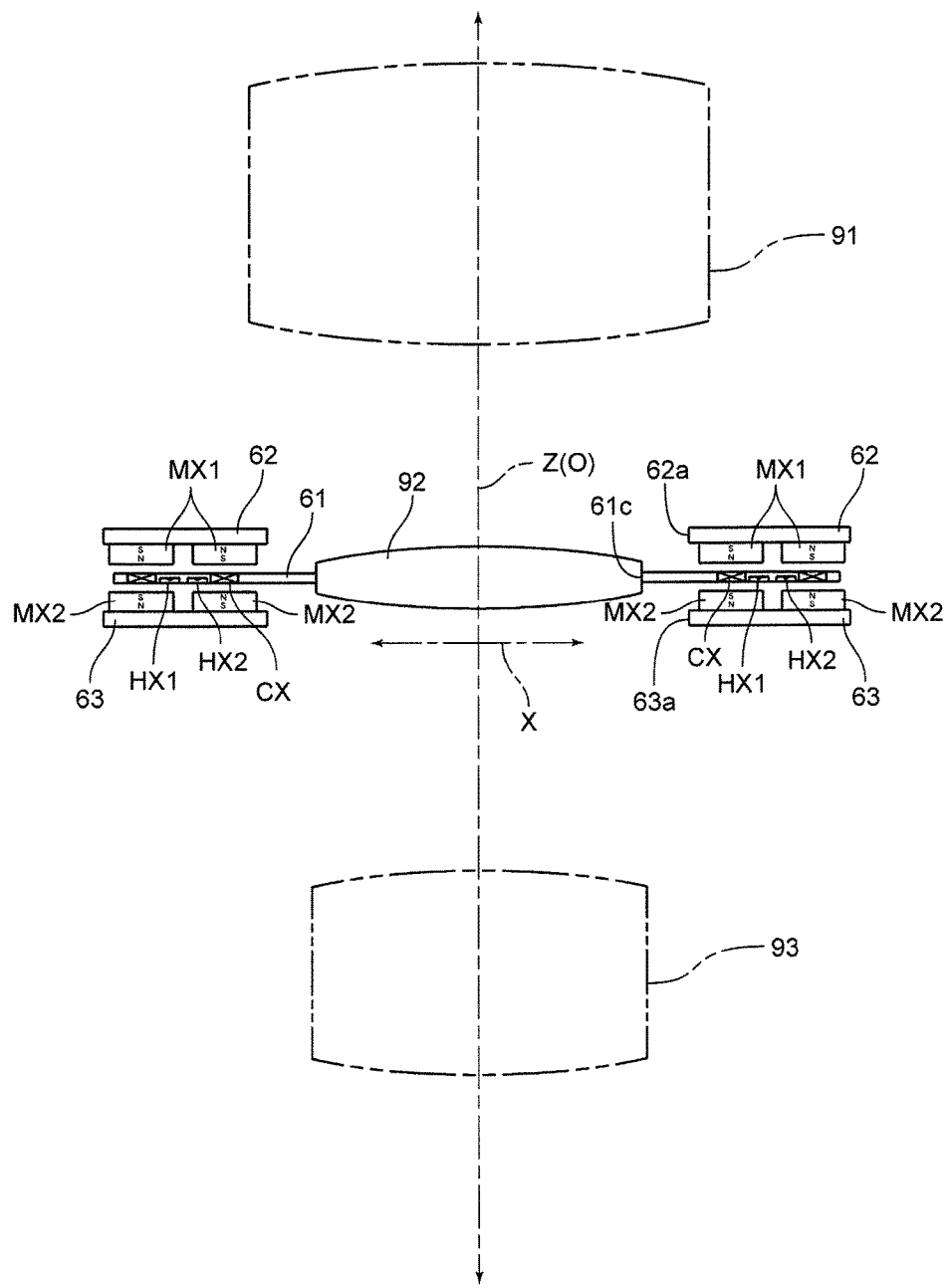
FIG. 16 is a cross-sectional view, corresponding to FIG. 2B, showing an embodiment of a shake correction device (image stabilizer), according to the present invention.

The stage apparatus of the present invention can also be applied to a lens barrel (e.g., a lens barrel disclosed in Japanese Unexamined Patent Publication No. 2015-4769) provided with an image-correction optical system in which one optical element of a photographing optical system is driven. For example, in the photographic lens 100, one or a plurality of optical elements of the photographing optical system can serve as a correction optical element (driven member). In this alternative embodiment shown in FIG. 16, a lens element (driven member) serving as a correction optical element 92 is provided between a first lens group 91 and a second lens group 93. The correction optical element 92 is mounted in an opening 61*c* formed in the approximate center of the movable stage 61. According to the present embodiment, hand-shake correction (image stabilization) and a special photographic effect such as swing-and-tilt photography by translating the movable stage 61 (correction optical element 92) in the Z-direction (optical axis O direction/first direction), the X-direction (second direction) and/or the Y-direction (third direction), and/or turning (rotating) the movable stage 61 (correction optical element 92) about the Z-direction (first direction), and/or tilting (rotating) the movable stage 61 (correction optical element 92) about the X-direction (second direction) and/or Y-direction (third direction). Furthermore, in the present embodiment, it is possible to carrying out a fine focusing adjustment by finely translating the movable stage 61 (correction optical element 92) in the Z-direction (optical axis O direction/first direction).

Furthermore, the digital camera 10, to which the present invention is applied, can carry out hand-shake correction (image stabilization) and/or a special photographic effect by a combined operation of a hand-shake correction device provided in the photographing lens 100 and a hand-shake correction device provided in the camera body 11.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photographing apparatus comprising:
   an imaging-plane tilter configured to tilt an imaging plane, formed by a photographing optical system, relative to a plane that is orthogonal to an optical axis direction of said photographing optical system;
   a focus detector provided with a plurality of focus detection areas;
   a tilt controller configured to control said imaging-plane tilter to tilt said imaging plane based on focus deviation amounts of said plurality of focus detection areas;
   a focus deviation-amount detector configured to detect a focus deviation amount for each of the plurality of focus detection areas;
   an auto-focus driver configured to drive a focal adjustment optical element to an in-focus position based on at least one of the focus deviation amounts; and
   a calculator configured to calculate, based on the focus deviation amounts of the plurality of focus detection areas detected by the focus deviation-amount detector, a tilt correction amount for tilting said imaging plane so that each of the focus deviation amounts become minimum values.

2. The photographing apparatus according to claim 1, wherein said plurality of focus detection areas include selection focus detection areas arranged in two mutually orthogonal directions, and selection focus detection areas arranged in at least one diagonal direction that is diagonal to each of said two mutually orthogonal directions, and
   wherein said calculator calculates said tilt correction amount based on focus deviation amounts detected at the selection focus detection areas of at least one said two mutually orthogonal directions and said diagonal direction.

3. The photographing apparatus according to claim 1, further comprising a manual selector configured to select, via a manual operation, a focus detection area for detecting a focus deviation amount.

4. The photographing apparatus according to claim 3, further comprising:
   an image sensor configured to capture an object image that is formed through said photographing optical system; and
   a touch panel display configured to display said object image that is captured by said image sensor,
   wherein said manual selector selects a focus detection area for detecting a focus deviation amount upon said touch panel display receiving a corresponding touch operation.

5. The photographing apparatus according to claim 3, further comprising:
   a finder for viewing an object image, formed through said photographing optical system; and
   a view-point detector configured to detect a view-point of a user that is viewing through said finder, wherein said manual selector selects a focus detection area that aligns with said view-point detected by said view-point detector.

6. The photographing apparatus according to claim 3, further comprising:
a finder for viewing an object image, formed through said photographing optical system; and
a view-point detector configured to detect a line-of-vision of a user that is viewing through said finder,
wherein said manual selector selects focus detection areas that are arranged in a direction of movement of a view-point detected by said view-point detector.

7. The photographing apparatus according to claim 1, further comprising a priority mode selector configured to select one out of a plurality of priority modes, wherein each of said plurality of priority modes prioritize a group of focus detection areas for detecting the focus deviation amounts.

8. The photographing apparatus according to claim 7, wherein said imaging-plane tilter includes an image sensor, said image sensor provided with a rectangular imaging surface which receives said imaging plane, and
wherein said priority mode selector is configured to select one priority mode out of at least one of:
a horizontal-direction priority mode, which prioritizes focus detection areas of the plurality of focus detection areas that are arranged in a horizontal direction of said imaging plane;
a vertical-direction priority mode, which prioritizes focus detection areas of the plurality of focus detection areas that are arranged in a vertical direction of said imaging plane; and
a diagonal-direction priority mode, which prioritizes focus detection areas of the plurality of focus detection areas that are arranged in a diagonal direction of said imaging plane that is diagonal to both the horizontal direction and the vertical direction.

9. The photographing apparatus according to claim 7, further comprising an acceleration detector configured to detect a direction of swinging of said photographing apparatus, wherein said priority mode selector selects said priority mode based on a detected direction that is detected by said acceleration detector.

10. The photographing apparatus according to claim 7, further comprising:
a finder for viewing an object image, formed through said photographing optical system; and
a view-point detector configured to detect a view-point of a user that is viewing through said finder,
wherein said priority mode selector selects a focus detection area that aligns with said view-point detected by said view-point detector.

11. The photographing apparatus according to claim 7, further comprising:
a finder for viewing an object image, formed through said photographing optical system; and
a view-point detector configured to detect a line-of-vision of a user that is viewing through said finder,
wherein said priority mode selector selects focus detection areas that are arranged in a direction of movement of a view-point detected by said view-point detector.

12. The photographing apparatus according to claim 7, further comprising:
an image sensor configured to capture an object image that is formed through said photographing optical system; and
a touch panel display configured to display said object image that is captured by said image sensor,
wherein said priority mode selector selects a focus detection area for detecting a focus deviation amount, upon said touch panel display receiving a corresponding touch operation.

13. The photographing apparatus according to claim 1, wherein said imaging-plane tilter includes one of:
an image sensor; and
at least one optical element of said photographing optical system,
wherein said tilt controller tilts said imaging plane by tilting said one of the image sensor and the optical element relative to a plane that is orthogonal to the optical axis direction.

14. The photographing apparatus according to claim 13, wherein said imaging-plane tilter is also configured to translate said imaging plane in the optical axis direction, wherein said auto-focus driver performs a focal adjustment by finely adjusting the imaging plane in the optical axis direction via said imaging-plane tilter.

15. The photographing apparatus according to claim 1, wherein said auto-focus driver drives said focal adjustment optical element to said in-focus position based on a focus deviation amount of a focus detection area that is located closest to a center of a photographing frame out of said focus deviation amounts.

16. The photographing apparatus according to claim 1, wherein said focus deviation-amount detector comprises a focus detector that utilizes a phase-difference detection method, in which a focus deviation amount within a focus detection area is detected by detecting a phase difference between a pair of pupil-divided object-emanating light bundles.

* * * * *